Jan. 1, 1935.  R. C. COXHEAD ET AL  1,986,137
ADDING MACHINE
Filed Aug. 26, 1926  11 Sheets-Sheet 5

Inventors
Ralph C. Coxhead
Charles W. Norton
by Ramsey Kent
Attorneys

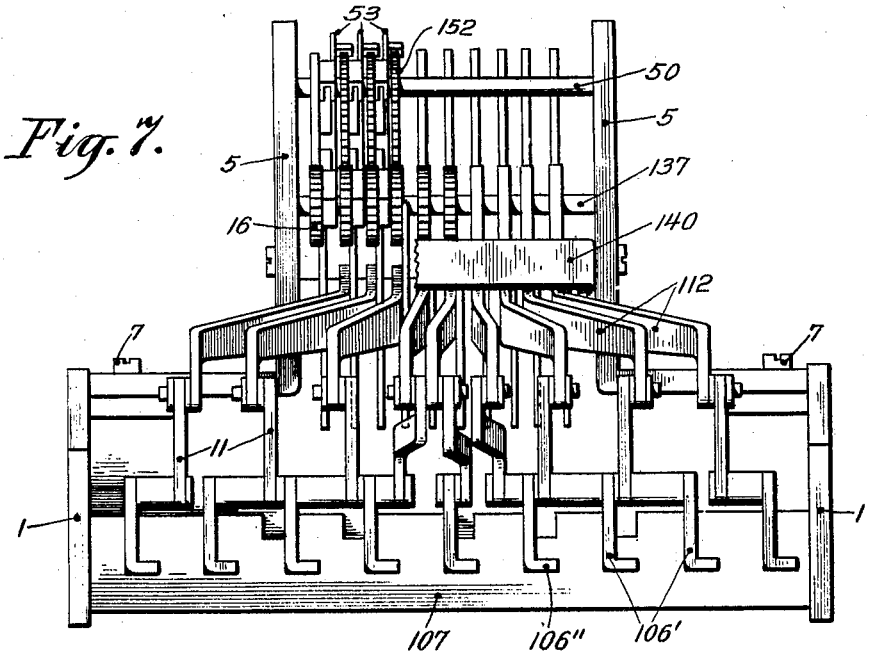
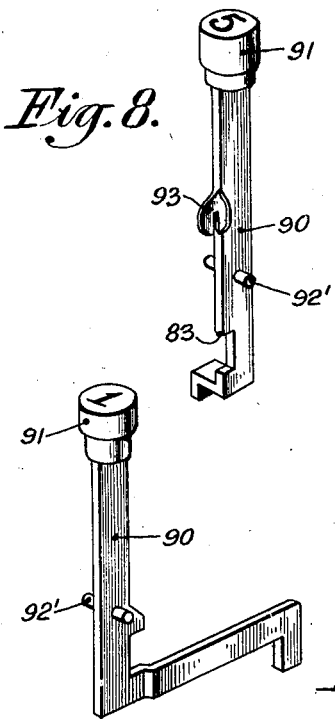
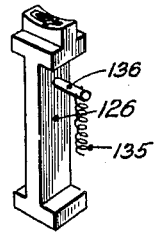
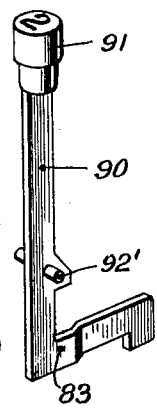

Jan. 1, 1935.   R. C. COXHEAD ET AL   1,986,137
ADDING MACHINE
Filed Aug. 26, 1926    11 Sheets-Sheet 8
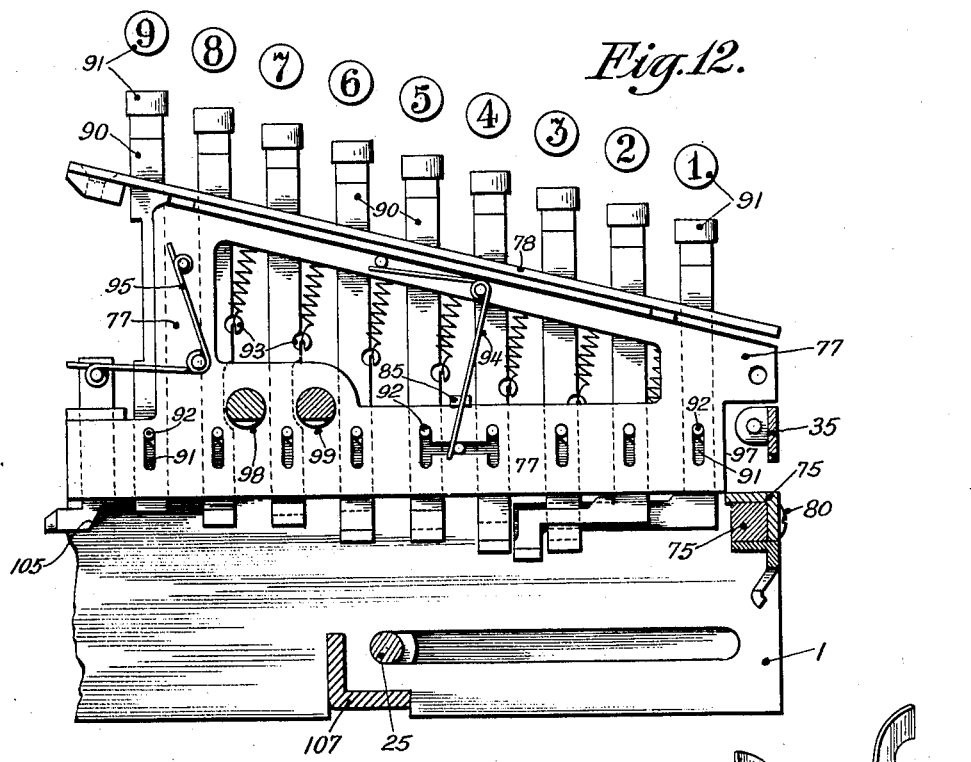
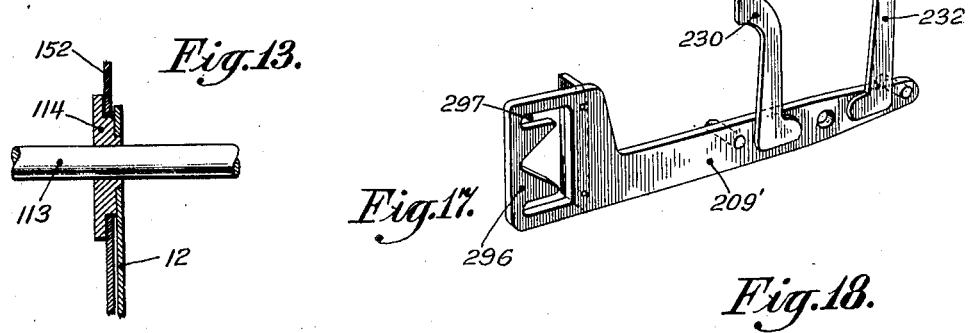
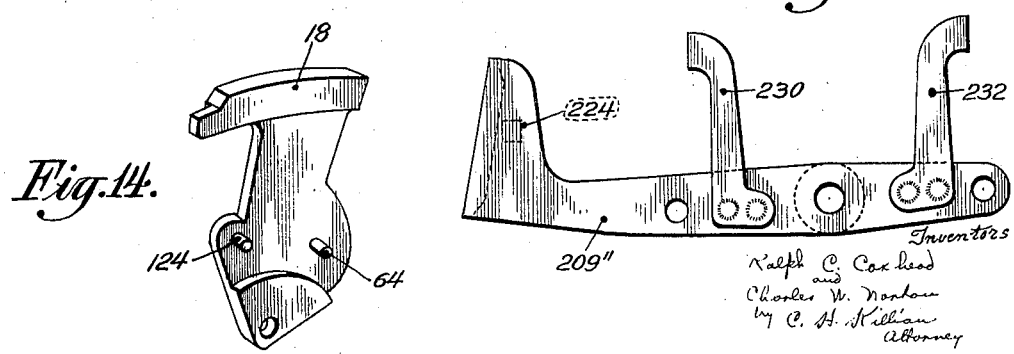

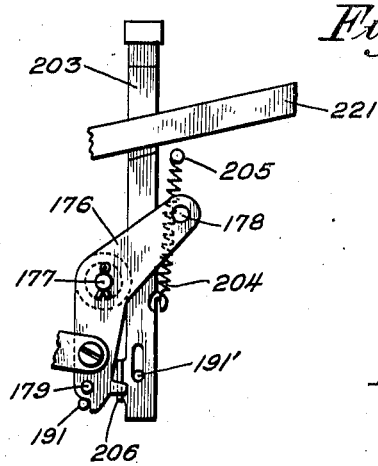
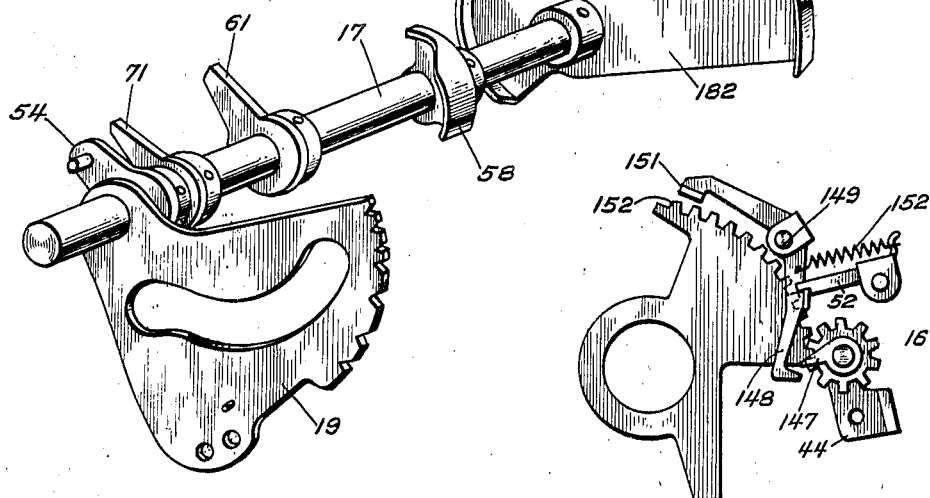
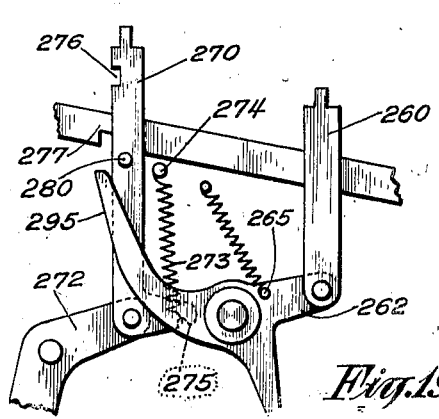

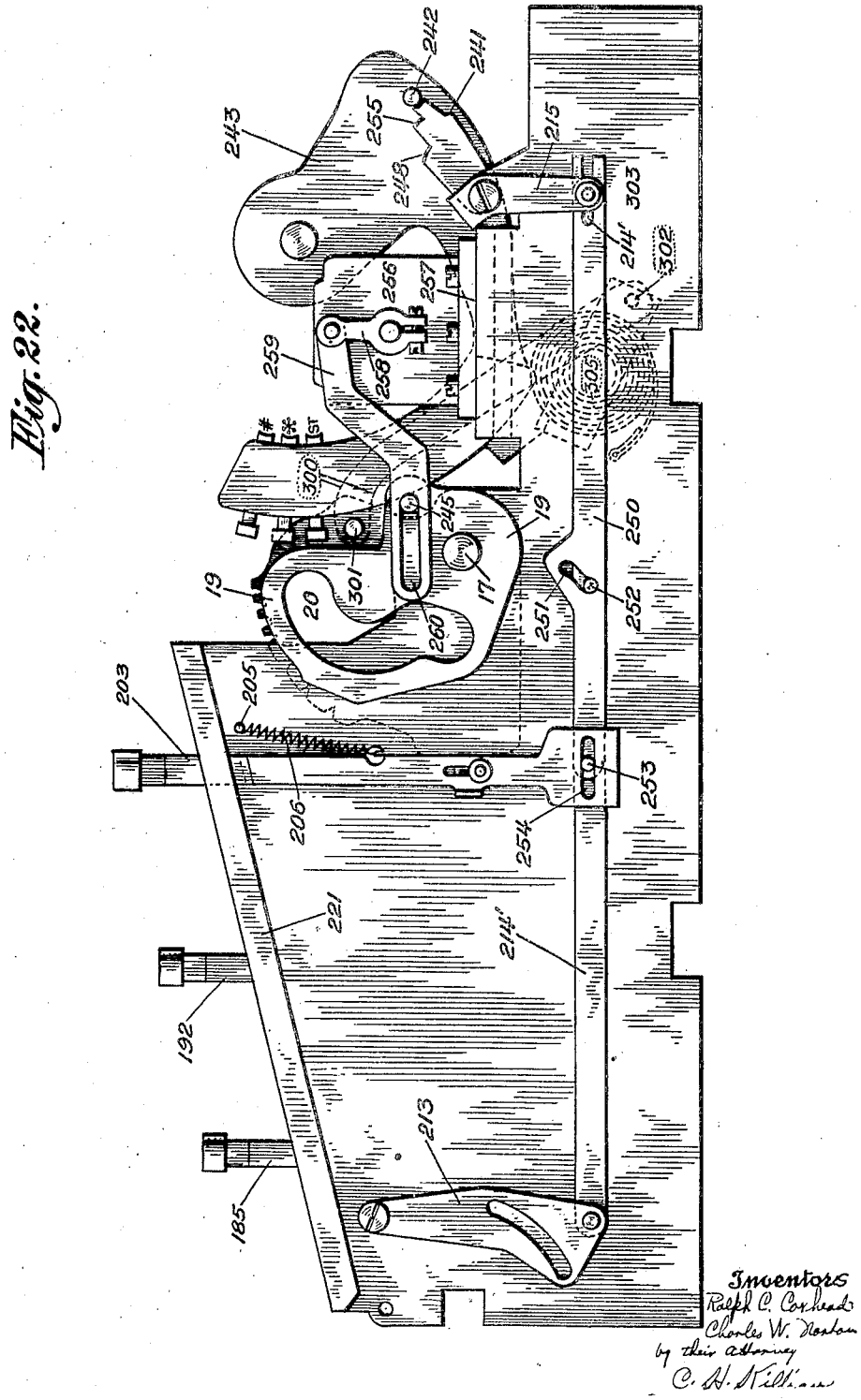

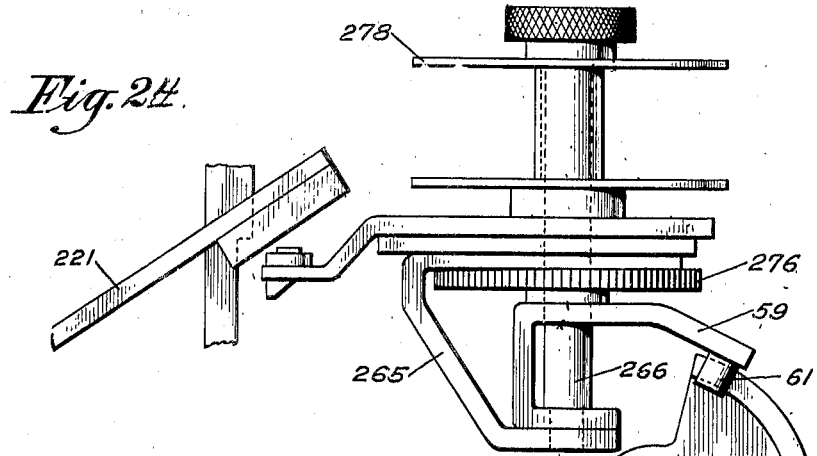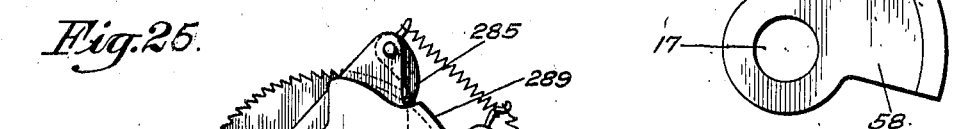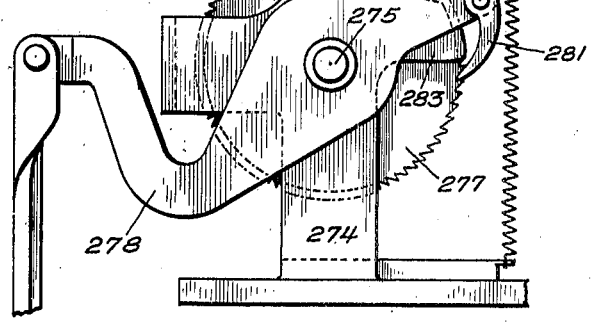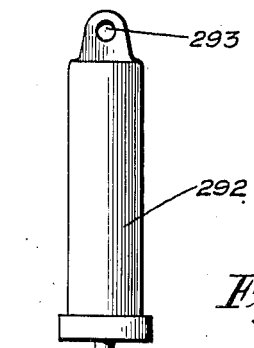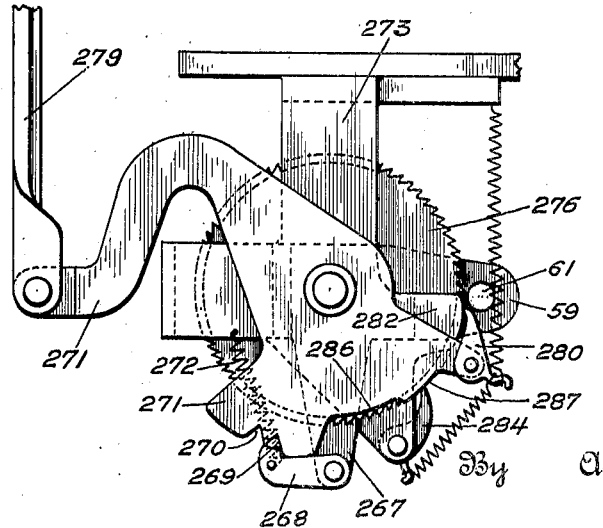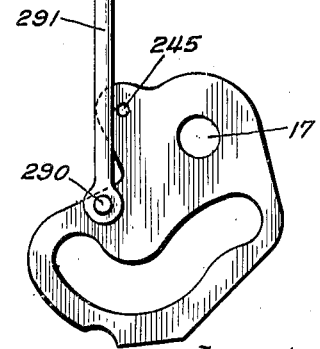

Patented Jan. 1, 1935

1,986,137

UNITED STATES PATENT OFFICE 1,986,137

ADDING MACHINE

Ralph C. Coxhead, New York, N. Y., and Charles W. Norton, West Orange, N. J., assignors, by mesne assignments, to Brunsviga Maschinenwerke Grimme Natalis & Co. A. G., Brunswick, Germany Application August 26, 1926, Serial No. 131,797

7 Claims. (Cl. 235—60)

The objects of this invention briefly stated are:—

To construct an adding machine provided with a full keyboard, automatic cipher cut-out, printing mechanism, total, sub-total, repeat, error, and non-add keys of a size heretofore considered impracticable because of the small size.

Another object of the invention is the construction of a novel full keyboard of a size heretofore considered impractically small and yet be free from the defect of depressing plural keys.

Another object of this invention is the preservation of substantially customary size of the listed items.

Another object of this invention is to eliminate the necessity of taking a blank stroke prior to the extracting of a total.

Another object of this invention is the preservation, and in some instances to materially increase the strength of all parts subject to torsional, transverse, or compressive stresses during the operation of the machine.

Another object of this invention is the foreshortening of the length of the base of the machine by the provision of novel offset mechanism in the keyboard for cooperating with the actuating mechanism.

Another object of this invention is the provision of novel tens carrying or transfer mechanism.

Another object of this invention is the elimination of a substantial percentage of reactional frictional losses.

Another object of this invention is the provision of improved means for driving the adding mechanism manually.

Another object of this invention is to provide a printing type adapted to give an uniform outline to printed indicia on a curved paper support.

Another object of this invention is to guard against stumbling of a transfer tooth against the tripping lever.

Another object of this invention is to provide new and novel precussive printing mechanism of unprecedented small size having a limited range of action for supplying the necessary kinetic energy to secure the necessary energy of impact on the prepositioned type.

Another object of this invention is to provide means for measuring the extent of service rendered by this machine.

Another object of this invention is the provision of a new and novel ribbon feeding and reversing mechanism as well as operating means therefor.

Another object of this invention is to provide new and novel means for permitting the construction of the machine in a number of separate sub-assemblies so that when the said sub-assemblies are properly joined together with a minimum of connections the machine is completely assembled.

Another object of this invention is utilization of a type of construction permitting the removal of the entire base of the machine and thereby facilitate both assembly and repair.

Another object is the provision in the construction of the machine of certain elements which may be readily removed or replaced by other elements having additional or different functions.

In the drawings forming a part of this specification:—

Fig. 7 is a view looking from the rear of the machine with certain parts omitted and certain others broken away.

Fig. 8 is a perspective view of the "5" numeral key.

Fig. 9 is a perspective view of the "1" numeral key.

Fig. 10 is a perspective view of the "2" numeral key.

Fig. 11 is a perspective view of a printing type showing the concave face of a printing character.

Fig. 12 is a view of a numeral keyboard section viewed from a direction opposite to that in Figs. 1 and 2.

Fig. 13 is a section of the shouldered hub joining the type carriers and the actuating gear sectors.

Fig. 14 is a perspective view of a printing hammer showing the cut away portions for supplying sufficient clearance for attaching the printing hammer springs and for the cocking pins.

Fig. 15 is a detached view of the totalizer and its transfer mechanism.

Fig. 16 is a diagrammatic perspective of the main shaft showing certain of the parts rigidly attached thereto.

Fig. 17 is a modified form of locking element 209.

Fig. 18 is another modified form of locking element 209.

Fig. 19 is a modified form of the error key.

Fig. 20 is a modified form of the key lock.

Fig. 21 is a view of a non-add key.

Fig. 22 is a view of the service register, the main returning spring and a form of non-add.

Fig. 23 is a view of the dash pot mechanism.

Fig. 24 is an end elevation of the ribbon mechanism.

Fig. 25 is a plan view of the ribbon mechanism.

General description

The adding machine described herein is new and novel in many respects. Heretofore adding machines have followed certain general forms which may be roughly defined as resembling in appearance and mode of operation that disclosed in the patent Burroughs 504,963. September 12th, 1893. Indeed the approximate shape, size and locations of principal elements have been carried forward into a variety of machines of this class. Applicant has constructed a machine provided with a full flexible keyboard, total and sub-total keys, repeat and correction keys, (printing control keys) the necessary interlocking safeguards between all keys, automatic zero-eliminating printing mechanism, and a totalizer with delayed carrying mechanism which occupies far less volume than any machine similarly equipped; yet the machine prints in substantially the familiar characters of familiar size, and further the absolute strength of the elements entering into the construction when considered as beams and columns are of substantially standard or even greater strength than similar or corresponding parts found in the familiar machines of this general class. Such construction is not merely a proportional diminution in the relative size of elements but consists of a rearrangement of the principal working members which must act as beams or columns or both during the operation of the machine.

Figure 1:
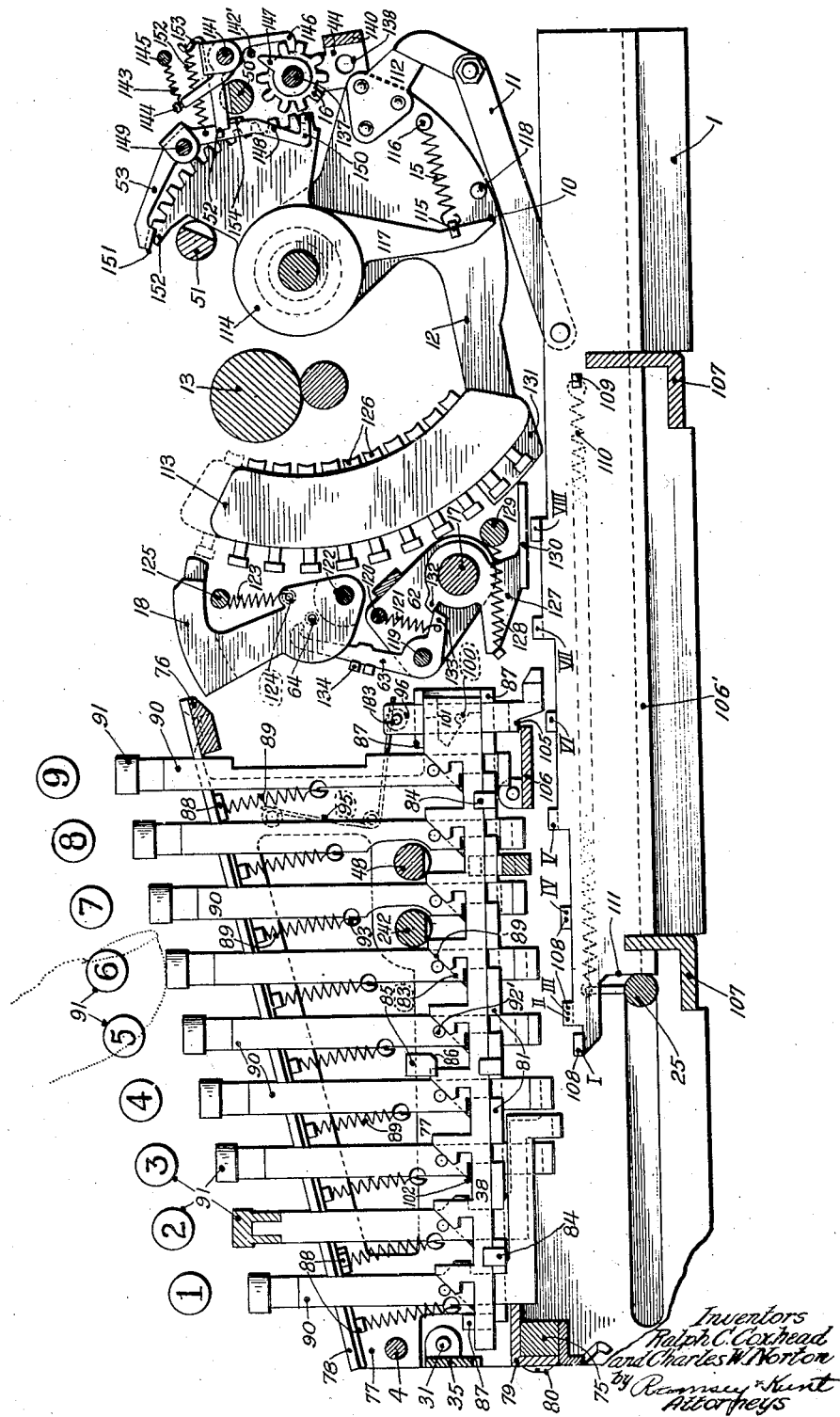
Fig. 1 is a longitudinal section through substantially the middle of the machine with all parts in normal position.
Figure 2:
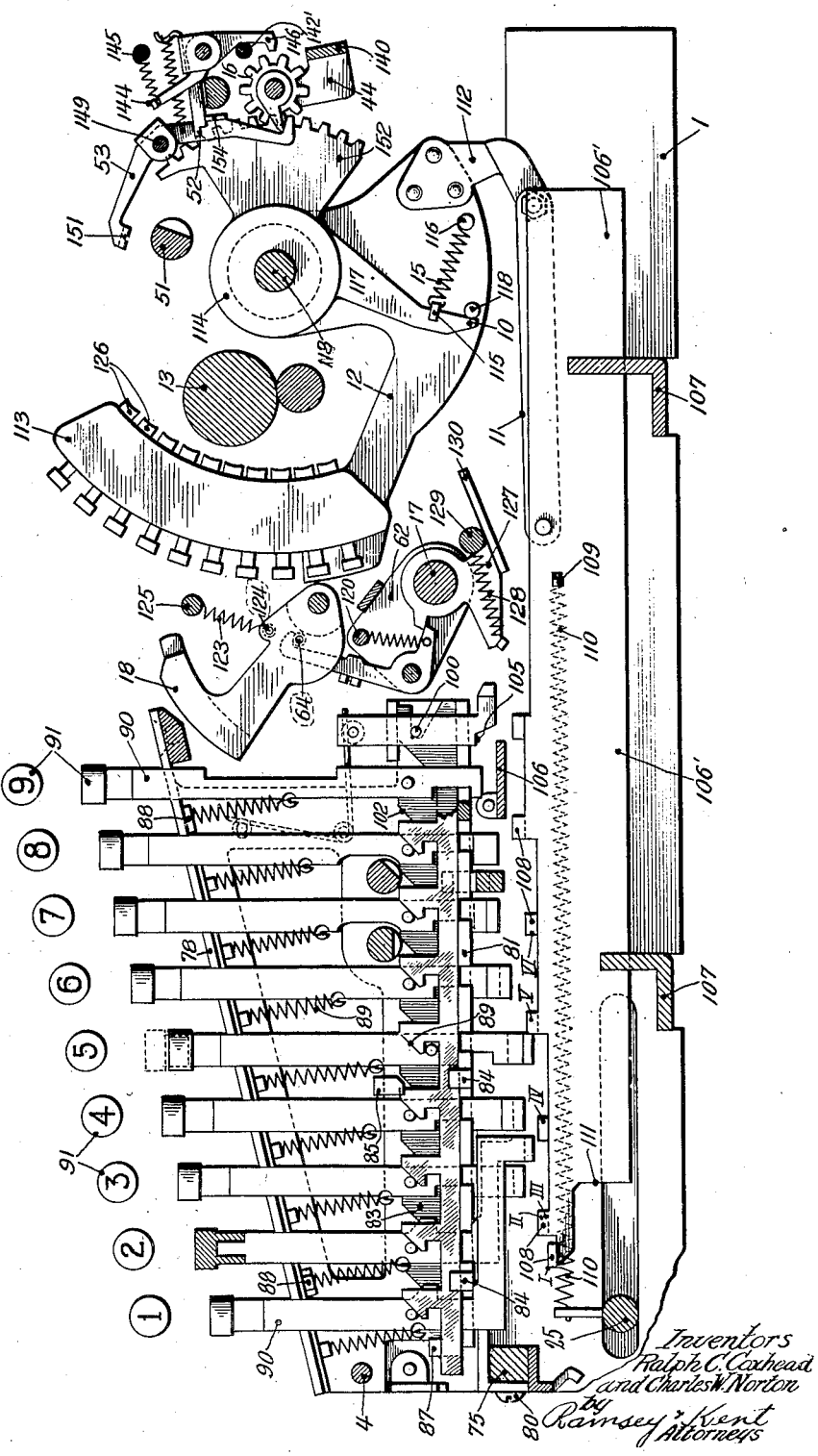
Fig. 2 is the same as Fig. 1 except that the parts are shown in a possible position at the end of the forward stroke of the operating handle.

Thus the numeral keyboard is located in the front part of the machine as shown in Figs. 1 and 2. The numeral keys have relatively long shanks and are guided by suitable supports and are shaped so as to effect substantially maximum resistance to distortion during the operation of the machine. The actuators 106' are necessarily long members which usually act as columns, struts or beams or both during the operation of the machine. Applicant by an ingeneous arrangement of the numeral key shanks has considerably increased their relative strengths as members capable of transmitting both transverse and compressive forces which always occur in the normal operation of such machines as is clearly shown in Figs. 1 and 2. Similarly the printing type sectors and totalizer wheel actuators are considerably foreshortened in a radial direction with a resultant equivalent capacity for resisting forces which increases in a manner depending generally linearly with length and the square of the radius of gyration of the effective resisting section. Such increase in strength is made manifest in a striking manner in the strength of the usual driving and restoring springs which, because of the much smaller momentums to be controlled, are comparatively light and therefore the frictional reactions are correspondingly smaller, and therefore the driving torque for operating the machine is also correspondingly reduced from that utilized in the now familiar machines. Such reductions have made themselves peculiarly manifest in the totalizing mechanism. Indeed the pinions of the totalizer have an addendum diameter less than the hollow supporting shaft of the corresponding elements of a machine of this class which is now appearing on the market. Such constructions therefore preserve or even augment the capability of the working members to withstand the operating stresses and at the same time very substantially decreases the necessary driving torque of the machine while preserving a substantially customary size and form in the listed record.

This construction also tends to effect large economies in manufacture, inasmuch as machines of this type are commonly constructed largely of the output of the punch press. Therefore, the corresponding punches and dies are of much lighter construction and are therefore correspondingly more economically maintained.

In accordance with the briefly described construction the numeral keyboard is located towards the front of the machine, the special keys such as the total, sub-total, repeat, error, etc. are suitably located at the sides of the main numeral keys. The numeral keys extend generally downwardly towards the base of the machine, where their lower ends cooperate with lugs on the actuators 106' to govern the extent of movement of the type sectors and gear sectors. Between the actuators and the type sectors are the concentrating links 11 which reduce the spacing of the said actuators 10 corresponding to the numeral key spacing to that of the printing mechanism. The type carriers 12 are of an arcuate shape with the type converging radially towards the center of the platen 13. The gear sectors 152 are flexibly connected to the type carriers by suitable springs 15. The totalizer 16 is located in a cradle pivoted on the rear part of the frame of the machine and is controlled by suitable mechanism shown in Figs. 5 and 6 for governing the times of engagement and disengagement with the gear sectors. The platen 13 is located substantially forward of the main supporting shaft of the type carriers and is suitably controlled from the main shaft of the machine. The power for driving the machine through its various cycles is obtained from the manually driven main shaft 17 which is suitably connected through certain mechanism to be more fully described hereinafter to the various functioning elements for determining the proper times of operation. The printing hammers 18 are located in a suitable position for effecting a properly timed precussive blow on preselected positioned type.

Machines of this class are usually delivered to customers with period of free service on repairs and replacements of broken or damaged parts.

Such service is usually made on a time basis, as for example, one year immediately following delivery. Such service should manifestly be based upon the extent of use or number of operations performed by the machine. In order to measure the extent of use a non-resetable consecutive numbering device is directly connected to the main operating shaft as is illustrated in Fig. 22. Manifestly such a device will count the number of strokes of the main operating handle and thus gives a measure of the number of calculations performed. Hence such a machine can be sold subject to freedom from expense for, say 100000 operations instead of a definite time period thus insuring equal protection to both the occasional user and to the continuous user.

Main shaft

The different mechanisms of the machine receive their effective movements at various times from the main oscillatory main shaft. The details of the connections from the main shaft will be described in detail hereinafter. At this point a list, rather than a detailed description of these mechanisms will be given. The main shaft, is represented by 17, is driven by the handle or manipulative device and has rigidly attached thereto certain arms, cams, cam plates etc. which now will be briefly noted.

The main shaft is adapted to positively move the actuators to a restored or normal position and coincidentally stress certain springs for insuring forward movement of the said actuators. Near the ends of the shaft 17 and moving therewith are the plates 19, each of which is provided with a cam slot 20 (Figs. 3, 4, 5 and 6). Fitting in each cam slot is an antifriction roller 21 mounted on a pin rigid with arms 22, one on each side of the machine, said arms 22 being loosely pivoted on studs 23 attached to the main framework of the machine. The lower ends of said arms 22 are connected to links 24. Said links are in turn suitably connected to a universal bar 25 which is constrained to move in slots 26 in the side frames of the machine. Thus it is seen that when the shaft 17 is moved in an anticlockwise direction as viewed in Figs. 5 and 6 by the operator the universal rod 25 is moved forwardly. If the numeral keyboard has released one or more actuators 106' said actuators will under the influence of suitably positioned springs follow the said universal bar until limited in their forward movements. On the return movement of the shaft the said universal bar 25 contacts with suitable surfaces or shoulders on the actuators and restores them to their normal positions and coincidentally restoring the springs attached to said actuators to normal position.

The main shaft is adapted to release any depressed numeral keys at about the time the actuated shaft reaches its home position. For accomplishing this function a spring pressed wipe pawl 27 pivoted on a stud 28 rigid with the said plate 19 which as noted is rigidly attached to the main shaft. Said pawl 27 is normally held in the position shown in Fig. 3 against pin 29 by spring 30. At near the beginning of the forward movement of the shaft 17 said pawl 27 merely rides over the projection 31 of the bell crank lever 31—32 stretching spring 30 thence returning to its initial position, but its point or working surface 33 will be below arm 31 of the bell crank lever 31—32 hereinbefore mentioned. On the return movement of said main shaft the pawl 27 contacts with the lower side of the said arm 31 (unless disabled by the repeat key) thereby rocking said bell crank 31—32 drawing the link 34 rearwardly. Said link 34 is suitably attached to a shutter or vane 35 pivoted at 36 and 37 on the main frames of the machine. Said shutter or vane 35 has its lower edge in proximity to the key locking slides 38. Hence when the link is drawn rearwardly by the rocking of the bell crank 31—32 the shutter or vane 35 pushes all the key locking slides 38 rearwardly thereby releasing any depressed keys.

In order to effect the proper engaging and disengaging of the totalizer with the toothed sectors the main shaft carries a spring pressed toggle wipe pawl 181 mounted on the plate 182 which is fast to the said shaft 17. Said toggle pawl 39 cooperates with pins 178 and 179 rigid with the pivoted arm 176 which in turn is connected with mechanism for rocking the totalizer cradle 44. Said mechanism is constructed in such a manner that the depression of the total key 185 reverses the normal mode of operation of the adding cycle that the sub-total key 192 causes the totalizer wheels to remain in engagement during the effective forward and return strokes of the main shaft, and the non-add key 203 (Fig. 21) causes the totalizer wheels to remain out of mesh on both the forward and return strokes of said shaft. This mechanism will be more fully described under the heading of Totalizer timing.

Figure 3:
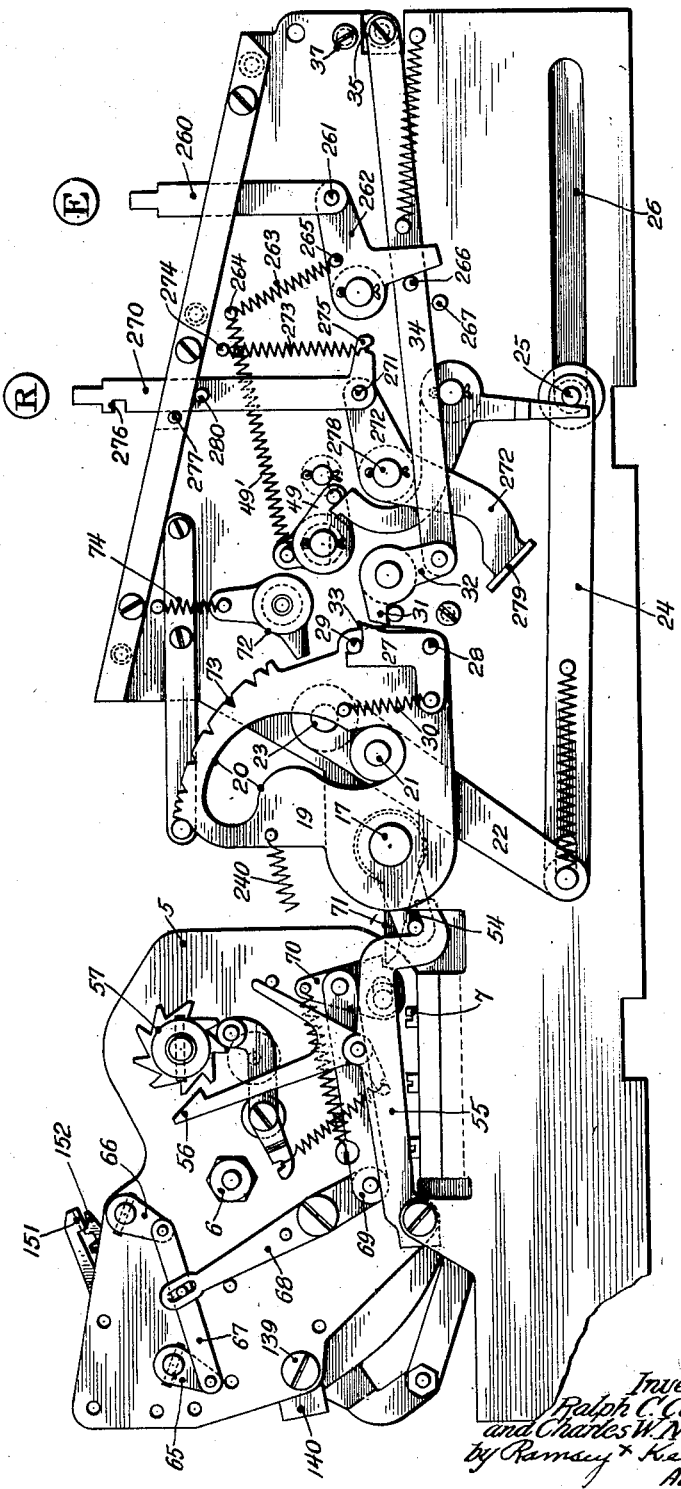
Fig. 3 is a view of that side of the machine best illustrating the repeat and error key mechanism when the handle is in normal position.
Figure 4:
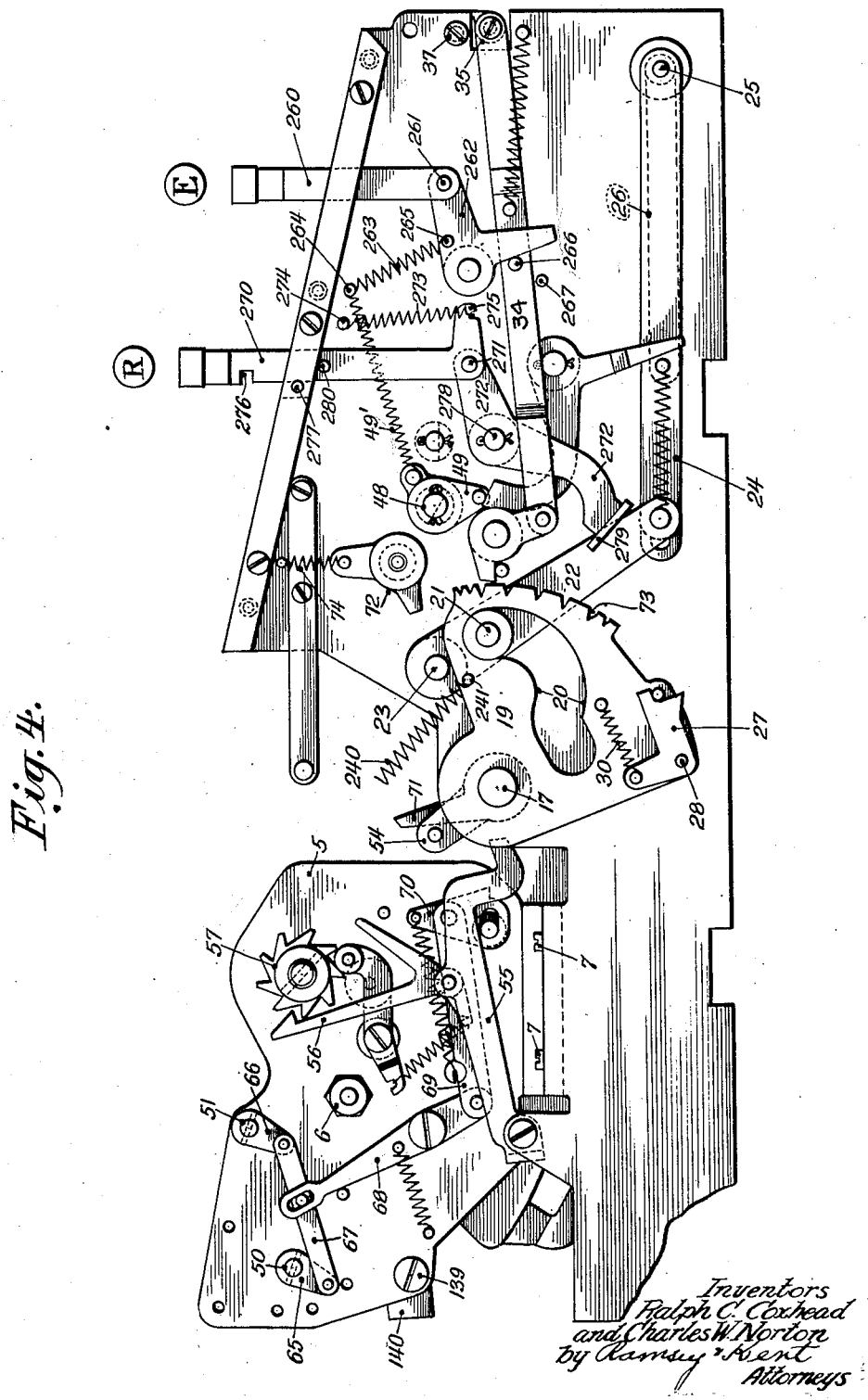
Fig. 4 is a view like Fig. 3 except that the parts have a possible position corresponding to the end of the forward stroke of the operating handle.

In order to prevent damage to the machine, it is desirable to lock all depressed numeral keys in depressed position and undepressed keys in normal position when the machine starts to operate. This mechanism is shown in Figs. 3 and 4 and consists essentially of a shaft 48 flattened on one side which may be turned by a spring urged crank 49 rigidly attached thereto.

The main shaft is adopted to restore the transfer mechanism and gear sectors to normal position at the beginning of the forward stroke so that a correct totaling operation can be had without the necessity of taking a blank stroke after adding a column of figures.

This mechanism consists of two shafts 50 and 51 each with flattened portions which are constructed and arranged to be given a movement at the beginning of the forward stroke of the said main shaft. The one shaft 51 is arranged so that an oscillatory movement thereof restores the adding gear sectors 152 to normal position while the totalizer is out of mesh and the second shaft 50 when oscillated restores the transfer mechanism including elements 52 and 53 to normal latched or cocked position. Said shafts 50 and 51 are each provided with cranks 65 and 63 (Figs. 3 and 4) connected by a pin carrying link 67. Said link 67 is adapted to be moved through the agency of the spring urged elements 68, 69 and 70 at the initial forward movement of the main shaft 17 by virtue of the projection 71 attached to said main shaft 17 coacting with the wipe pawl 70.

The main shaft is adapted to effect line spacing of the platen subsequent to the effecting of a printing operation. This mechanism consists essentially of an arm 54 rigid with the main shaft 17 which is adapted to act through a series of spring retracted elements 55 and 56 for rotating the platen 13 one space at about the end of the return movement of the handle through the agency of the rachet wheel 57.

The main shaft is adapted to control the feeding of the printing ribbon at about the time of the completion of the line spacing of the platen. This mechanism consists essentially of an open drum cam 58 (Fig. 16) rigidly attached to the main shaft 17 which cooperates with a spring pressed lever 59 cooperating with the ribbon spool rachets 276 and 277 (Figs. 25 and 26).

The main shaft is adapted to effect the tensioning of the printing hammer springs which are to be effective for any particular operation then to release said hammers for operation before the listing strip has been fed forward. This mechanism consists essentially of a projection 61 (Fig. 16) rigid with the main shaft 17 which is adapted to rock the frame 62 (Figs. 1 and 2) carrying the hooks 63. Said hooks 63 are arranged so that they will engage pins 64 on the printing hammers 18 on occasion and hence downward rocking of the said frame 62 will cause tensioning of certain of the springs 123 attached to the hammers 18. When the said frame 62 reaches about its extreme of downward movement said hooks are released from said pins 64.

The main shaft must always make a complete forward and complete backward stroke upon each operation of the machine. In order to effect this function the spring centralized member 72 (Figs. 3 and 4) is partially rocked by the forward interference of the periphery of member 19. Said periphery is provided with a series of notches 73 which are formed in such a manner as to effectually prevent return movement of the said member 19 until said pawl is again centralized by its spring 74 by virtue of the fact that said peripheral interference is removed beyond the zone of action of said pawl. The same action occurs during the return of the handle but in reverse order.

The adding keyboard

For the purpose of initiating a mechanical representation of a number or quantity to be added into the totalizer I provide a numeral keyboard which is best shown in Figs. 1, 2 and 12. It will be seen that the keyboard is built up on a number of denominational units secured together and to the main frame work by the cross bars 75 and 76 near the lower end of the "one" keys and near the upper end of the "nine" keys respectively. The keys are mainly supported and guided by the denominational frame 77 and the pierced strip 78 suitably secured thereto. The denominational frame 77, best shown in Figs. 1, 2 and 12 may be constructed of a suitably formed blank which is then bent to form suitable lugs, guides, etc. for accomplishing the desired functions, thus the pierced lug 79 at the lower narrower end serves to secure the denominational frame to one of the said cross bars 75 with a suitable securing means 80, the lower edge is in the form of a coarse comb bent at substantially right angles to the main body portion. The teeth 81 serve to support the key locking slide 38 and the slide 83 between which the number keys pass thus forming a crenellated flange for guiding the numeral keys and said slides 38 and 83. Certain of the teeth, or crenellations such as for example those between the "one" and "two" keys, the "four" and "five" keys, and the "eight" and "nine" keys may be made somewhat longer on the said blank. The extended portions 84 are then bent upwardly substantially at right angles to the said teeth or crenellations to form lower guides for the said key locking slide 38. At any convenient place a tongue on the said denominational frame is formed with a double bend to form a guide 85 for the upper discontinuous or broken edge of the said key locking slide 38. Said guide 85 may be relieved slightly at 86 to facilitate the assembly of the key locking slide with the denominational frame. At the extreme front and rear of the denominational frame 77 are portions 87 bent at right angles to the main body portion for more completely constraining the movements of the key locking slide 38 and the slide 83 in substantially a straight line. At the upper slanting edge of the said denominational frame 77 are a plurality of pierced lugs 88 bent in a suitable manner to support the said pierced strip 78 in proper relation to the aforesaid lugs, guides etc. The denominational frame may be fitted with studs or suitable formed bent over portions between the number keys for forming an anchorage for the keys returning springs 89. The pierced strip 78 is formed with suitable openings for the upper ends of the numeral keys 90. It is thus seen that the numeral keys are constrained to a rectilinear motion by the openings in the pierced strip 78 at their upper ends by the coarse comb teeth or crenellations 81 and the guided slides 38 and 83 at their lower ends. Referring particularly to Fig. 12 it is seen that the denominational frame is provided with a plurality of elongated slots 91 which limit the extent of movement of pins 92 which are integral with the numeral keys 90 for limiting the extent of movement thereof. Said denominational frame 77 is provided with a series of projections shown as studs, for supporting the fixed supports of the springs 94 and 95, the former serving to urge the key locking slide to effective position; and the latter for serving a similar function for the zero stop 96. The denominational frame is provided with a cut out notch 97 and two holes 98 and 99 for a purpose to be fully explained under the total key heading. Said frame may be skeletonized as shown for the purpose of saving weight in completed machine.

Each numerical denomination is provided with nine numeral keys 90, each key is constructed and positioned so as to be capable of mechanically representing any digit of its denomination. The function and operation of all the numeral keys are substantially identical. Each number key 90 as has been pointed out herein is constrained to move rectilinearly with respect to the denominational frame 77. Each key 90 is provided with an identifying cap or head 91 suitably attached to the stem or shank thereof. Each shank is provided with a pin 92 hereinbefore noticed for determining the extreme limits of its motion. Each key is provided with a suitable anchorage, illustrated as a slotted "squeeze" 93 for the attachment of a spring 89; the other end of which is attached in a suitable manner to the denominational frame 77; which urges the key to its normal upward position. Each key is provided with a pin 92 normally resting on the sloping face 99 of the key locking slide 38; so that when a key is depressed said slide 38 is forced rearwardly against the constant urging of a suitable spring until it has reached substantially its fully depressed position when said slide 38 is free to move forwardly to lock the key in depressed position. As shown the separately designed pins 92 and 92' are in reality the same member which is suitably attached to the key but extends outwardly on both sides thereof. At their extreme lower ends the keys are suitably offset in different and suitable directions to form non-conflicting positive stops for determining the extent of differential forward travel of the bars 106' which as will be more particularly pointed out herein which are connected with the adding and printing mechanisms. All the even numbered keys above the "two" are offset in one direction and the corresponding higher odd keys are offset in the opposite direction. Normally the bars 106' are held against forward movement by the zero stops 96 which must be released by any key of the corresponding row. The extreme extent of movement of the bars 106' is of an extent sufficient to cause the adding of nine into the totalizer, hence the "nine" key does not need to limit the travel of the corresponding bar 106'. It is noted that the bars 106' travel forwardly, and for the purpose of foreshortening the case of the machine the first two numeral keys are offset rearwardly as well as latterly for this purpose. Thus the "one" key has an offset projection extending first latterly thence rearwardly and downwardly in the vicinity of the lateral offset of the "four" key; and the "two" key has a similar but somewhat shorter projection extending to about the same position. Such offsetting is clearly shown in the detailed perspective views herein designated as Figs. 9 and 10.

For the purpose of normally restraining forward movement of the bars 106' there are provided zero stops which must be moved by any numeral key of the corresponding denominational order. Further all the zero stops must be removed from their normal positions by any total key so that the bars 106' will be limited in their forward travel by the totalizer during total taking. The zero stops 96 may be likened to a "stub zero" key which is normally depressed but which is raised by any other numeral key. This analogy is the more striking when it is observed that each zero stop has substantially the same shape, movement and rectilinear constraint as has the numeral keys. The denominational frame 77 guides the vertical movement of its associated zero stop in a manner similar to the guiding of the numeral keys, and further the said stop is confined between the key locking slide 38 and the slide 83 as are the numeral keys. Each zero stop is provided with a pin 100 which fits in the cut away part 101 of the slide 83 and rests on the sloping part thereof. The slide 83 is provided with sloping faces 102 adjacent each numeral key so that when any key is depressed said slide is forced rearwardly thus causing the pin 100 on the zero stop to elevate said stop, thus disabling said stop and rendering the numeral key effective to limit the extent of movement of the associated slide 106'. Each zero stop is provided with a pin 183 which is urged downwardly by the spring 95, and since pin 103 rests on the sloping portion 104 of the slide 83 said slide is urged forwardly. When any numeral key is depressed it is held depressed for a suitable length of time by the key locking slide 38 engaging pin 92' hence the corresponding zero stop is held elevated for the same length of time. The lower end of each zero stop is suitably offset to cooperate with a suitably placed projection on the slide 106'. Each zero stop is also provided with a cut out portion 105 which is utilized as an engaging face for the upper edge of a shutter or bail 106 for elevating all the zero stops when a total key is depressed.

Actuators

For the purpose of transferring the amount mechanically represented by the depressed numeral keys to the actuators and to the totalizer there is provided a set of members known as actuators, type carriers, and gear sectors.

The actuators comprise the slides 106', one of which is provided for each denominational order of the numeral key-board. The actuator slides 106' may be formed as a series of angle shaped members with a lower flange 106'' which serves to constrain said actuators to a substantial rectilinear motion by confining them to the L-shape slots in the cross tie bars 107 rigidly attached to the main frame of the machine.

The forward upper edge of the actuators 106' has an uneven stepped appearance with lugs 108 integrally attached thereto. Said lugs 108 are turned over in alternate directions and form limit stops for co-operating with the lower offset ends of the numeral keys in the order shown. Thus the lugs designated IV limits the movement of the actuator corresponding in amount to that required to position the 4 type at the printing line and to cause the rotation of a totalizer wheel four teeth as shown in Fig. 2. Likewise the lugs VI permits a corresponding movement to print and add six. Similarly for the remaining lugs.

Each actuator 106' is provided with a stud 109 to which is attached a spring 110. The other end of said spring being attached to a suitable portion of the bar 25 as indicated in Figs. 1 and 2. Said springs normally tend to move the actuators towards the front of the machine, but such movement is normally restrained by the contact of face 111 of the actuators with the universal bar 25 which as was hereinabove noted is moved with the main shaft of the machine.

The type carriers 12 are constructed to move distances somewhat greater than that required to carry a number of teeth corresponding to the depressed numeral key, past the totalizer wheel. Advantage of each excess movement is taken to completely remove the type carriers from visibility obscuring position in front of the printing platen when the machine is at normal, and also for the purpose of facilitating the actuation of the transfer mechanism.

At near the rear end of the actuators 106' each of them is provided with a stud to which is connected the concentrating link 11, which in turn is attached to a concentrating lug 112 attached to the type carrying segment 12. The type carrying segments are closely spaced whereas the actuator slides 106 are comparatively widely spaced. Therefore the provision of these concentrating links and lugs. The complete assembly of these concentrating links is shown in Fig. 7. From said Fig. 7 it will be noted that the concentrating links and lugs converge substantially equal extent from both sides of the machine thereby localizing the totalizer and the printing segments to substantially the middle of the frame work.

The type carriers are in the form of mutilated sectors 12 pivoted, on the main frame supported rod 113 by being staked to the comparatively thick and large diameter stepped hubs 114 as shown in section in Fig. 13. Each type carrier is provided with a rigidly attached offset arm or lug for attachment of the concentrating link 11 and with a cupped arcuate retaining and guiding cover plate for the numeral type 113. Fitted loosely on the stepped portion of the comparatively thick hub 114 is the gear sector 152 which is resiliently connected with said type carrying sector by the spring 15, the ends of which are connected to the bent over lug 115 on the gear sector and the pin 116 rigid with the type carrier. Said lug 115 is carried by an arm 117 integral with the gear sector 152 serves the additional function of limiting the extent of movement of the gear sector 152 in the direction of the pull of spring 15 by virtue of an interference with the pin 118 integral with the type sector.

Main frame assembly

One object of this invention is to make an adding machine without unnecessary weight. One genesis of weight is the heavy base plate usually found in machines of this class. Usually such base plate is used for squaring and "dowel locating" the main side frames of the machine. Nevertheless said side frames are tied together by various tie bars to more accurately locate and position said side frames. In a machine as small as this one the side frames may be tied together sufficiently by the use of tie rods and bars, thereby eliminating the usual heavy base plate, which may be replaced by a comparatively light "drip pan"; therefore the main frame work may be crudely likened to the chassis of an automobile.

The main side frames 1 are constructed of a suitable thickness of sheet metal and are tied together at their lower edges by comparatively heavy angles 107 which are attached to said side frames with suitable means such as dowel screws 3. At near the upper forward end said frames 1 are forced together by a suitable means such as a threaded tie rod 4; compressed between the said side frames 1 by said tie rod are the series of members 77 herein denominated as the denominational frames. Said denominational frames are constructed roughly in the form of a mutilated shallow box; each carrying one denominational row of keys; and when compressed as described they form the equivalent of a series of thick spacing and squaring plates or blocks for correctly squaring said side frames 1.

There is a set of auxiliary side frames 5 mounted towards the rear of the said main plates 1 and are suitably secured thereto by any desirable means such as dowel screws 7. Said auxiliary frames 5 are comparatively near together and can be conveniently squared with each other by a comparatively heavy shouldered rigid threaded shaft 113 fitted on each side with suitable nuts 6. Said auxiliary frames 5 serve to support the major part of the closely spaced elements of the machine, the majority of said parts being supported on the said shaft 113. Hence it is seen that a comparatively yet extremely rigid structure is attained without the use of unnecessary weight.

Totalizer

In adding and analogous machines, it is necessary to actuate a totalizer to effect computing, and such totalizer must be provided with mechanism whereby a wheel of higher order is moved one step, when the adjacent lower one has completed a full revolution or its equivalent. Referring particularly to Figs. 1, 2 and 15, it is seen that each totalizer wheel 16 is provided with ten teeth. It is to be understood that each totalizer wheel may have any number of teeth as long as such number is an integral multiple of the computing radix. The totalizer wheels are mounted on a shaft 137 carried by a cradle 44. The totalizer cradle 44 may have either of two positions which may be arbitrarily identified as "in" and "out". The "in" denoting the position of the totalizer wheels in mesh or driven relation to the actuators and the "out" position denoting that when out of mesh or driven relation and when they are in such position they are positively held against accidental displacement.

The totalizer cradle 44 may be conveniently formed in a suitable shape from a blank of sheet metal comprising two substantially parallel arms 138 each pierced with two holes, one pair of holes serving to receive the studs 139 (Figs. 3 and 4) suitably mounted on a portion of the main frame work and the other pair serving to support the shaft 137 on which the totalizer wheels 16 are mounted and suitably spaced. Said arms 138 are integrally connected together by the bar 140. The totalizer cradle 44 is adapted to be rocked about the studs 139 by the link 160 (see Fig. 5) to carry the totalizer to its "in" and "out" positions.

Mounted loosely on the cross bar 141 is a bent sheet metal element 142 which is held resiliently against the shaft 142' by the spring 143 attached between an arm 144 integral with said member 142 and a suitable stud 145 carried by the framework. The lower end of said element 142 is bent forwardly as shown in Figs. 1 and 2 and given the approximate contour of a rack tooth matching the totalizer teeth. The solid tooth 146 so formed as resiliently held in a position where it barely clears the addendum circle of the totalizer wheels when the totalizer is in its "in" position. When the totalizer is moved to its "out" position the solid tooth enters an interdental space of the totalizer wheels before the driving relation between the actuator gear sector and the totalizer is disestablished. Continued movement of the totalizer to its "out" position carries the solid tooth 146 rearwardly.

As has been noted herein this machine is of heretofore unprecedented size and in order to avoid extremely accurate fitting of parts the totalizer cradle 44 and the solid tooth 146 are each pivoted on axes which are related in such a manner as to cause the totalizer wheels to travel an appreciable angular distance in the adding direction to more surely guard against the transfer point 147, from stumbling against the tripping lever 148 when the totalizer travels to its "in" position if some or all the wheels should stand in zero position. Referring to Figs. 2 and 15, it is clearly seen that a totalizer tripping point when in zero position travels in a direction which might be described as upwardly and rearwardly when referred to the point of the tripping lever 148. When the totalizer is going to its "in" position the reverse motion takes place and the extra angular movement of the totalizer wheel is thereby eliminated. It may happen that the extra added angular movement of the totalizer wheel when traveling to its "out" position may trip or partially trip the transfer mechanism but this is of no importance for the solid tooth 146 will hold the totalizer against transfer and any tripped transfer will be restored before the totalizer travels to its "in" position.

Transfer mechanism

In machines of this class it is necessary to provide means for advancing a totalizer wheel one step when a totalizer wheel of adjacent lower order moves an angular distance corresponding to the radix. Each totalizer wheel 16 is provided with a single tooth called the transferring tooth and designated herein as 147 which is a cam on one side and a lock on the other. During adding the tooth 147 may travel an angular distance corresponding to the radix, and when it does the cam side of such tooth cams its transfer lever 148 forwardly. There is a transfer lever 148 for each totalizer wheel. Said transfer levers 148 are loosely pivoted on a cross shaft 149 and each has a hook or nose 150 corresponding with the associated single tooth. Said nose is a cam on its lower side and a lock on its upper so that the cam of the tooth co-operates with the cam of the hook or nose; the locking surfaces also co-operate on the proper occasions. At the extreme upper end each transfer lever 148 is provided with a lug 151 which overlies a square locking shoulder 152 of the adjacent higher actuator to limit its upward movement. Occasionally the lug 151 is withdrawn from its normal locking position with respect to said actuator. Such occasion occurs when the cam portion of the single tooth cams the nose 150 forwardly. When such camming action completely occurs the transfer arm 148 is rotated about its pivot stretching the spring 152 extending between the said transfer arm and the substantially vertical arm 153 integral with the latch 52 loosely pivoted on shaft 141. Hence when arm 148 is swung about its pivot and the lug 154 integral therewith is carried beyond under surface of latch 52 whence spring 152 causes said latch to lock said lever in an abnormal position with its lug 151 out of the path of the adjacent higher actuators 152 as shown in Fig. 2. Since the lug 151 is withdrawn spring 15 will move its attached gear sector an additional tooth space when the main operating mechanism nears its home position.

*Printing mechanism*

It is desirable to print the items set up on the keyboard or the total extracted from the totalizer. Inasmuch as the printing mechanism operates upon every effective operation of the machine (except as hereinafter noted) this mechanism may be directly actuated from the main shaft of the machine.

It has been pointed out hereinbefore that shaft 17 is oscillated upon every operation of the machine. This shaft is the printing mechanism operating shaft and it has mounted thereon a frame 62 which moves in an anti-clockwise direction with said shaft 17, when the latter is turned by the main operating mechanism. Said frame 62 may be constrained to move with shaft 17 in any desired manner such as securing it loosely by a pin and slot to said shaft. The shaft or bar 120 supported by said frame 62 may be utilized as an anchorage for a series of springs 121, the other end of said springs being suitably secured to rearwardly extending arms of the hooks 63 pivoted on the shaft or bar 119 also supported by said frame. Therefore any movement imparted to frame 62 is transmitted to the hooks 63. Said hooks 63 are constructed of such shape and form as to engage pins 64 rigid with the resiliently normally positioned printing hammers 18. Said hammers 18 are loosely pivoted and suitably spaced on the shaft 122 supported by members 5. Each hammer is normally held in the position shown in Fig. 1 by a spring 123 extending from a stud 124 attached to said hammer to a universal bar 125 suitably supported by the side frame of the machine. As hereinbefore noted the type sectors are closely spaced, the hammers are also necessarily correspondingly closely spaced. Further the printing hammers are comparatively short and their precussive stroke is also short therefore the said hammers must be made comparatively heavy to secure the necessary strength of precussive blow. This is accomplished by making the upper edges of said hammers as wide as the available space permits. In this way the hammers may be made to guide themselves by making them sufficiently wide. Clearance must be provided for the herein mentioned members 63, 64 and 124, this may be done by relieving the hammer shanks as shown in Fig. 14.

If the machine is operated idly, that is when no amount or item is transmitted to the type carrying sectors 12 from either the keyboard or from the totalizer, the hammers remain in their normal positions, but when an amount is transmitted to said type carrying sectors the corresponding hammer, and all hammers to the right thereof are drawn forwardly and released, whence the springs 123 which were stretched will carry the hammers 18 rearwardly and cause a precussive blow to be struck against the head of the positioned type 126. In order to effect the connection between the said hooks 63 and the hammers 18 when the amount or item is transmitted to the type carriers I provide an irregularly shaped resiliently pressed plate 127 loosely mounted on shaft 17. Said plate 127 is normally held in the position shown in Fig. 1 by a spring 128; of suitable strength for accomplishing this function; stretched between a lug on said member 127 and a universal bar 129 suitably supported by the side frames of the machine. Said plate is normally prevented from moving in the direction by which it is urged by spring 128 by an extension 130 which contacts with a cam 131 integral with the type sector 12. When any type sector 12 has moved an extent greater than that necessary to position the topmost or zero type at the printing line the cam 131 passes beyond the extension 130 and the said irregularly shaped plate 127 whence spring 128 is permitted to contract. A lug or extension 132 integral with said plate 127 co-operates with the extension 133 on the hook 63 when the said hook is rotated about its axis 119 causing it to engage with the pin 64 rigid with the printing hammer 18. Integral with each hook 63 is a turned over lug 134 extending over the forward straight portion of the right adjacent hook 63. Therefore if some item such as for example 5000 is transmitted to the type carriers the hook 63 corresponding to the thousands denomination will be drawn into engagement with the pin 64 on the thousands printing hammer 18, by the contracting of the thousands spring 128. In the example assumed the spring 128 corresponding to the hundreds order will not be permitted to contract because of the position of cam 131 on the hundreds type sector; however, the hundreds hook 63 will be drawn into engagement with the pin 64 on the hundreds hammer 18 because lug 134 on the thousands hook 63 overlies the hundreds hook 63. The tens hook will be drawn into engagement with the tens hammer by the lug 134 on the hundreds hook. Similarly the units hook 63 will be drawn into engagement with the units hammer. The enabling of the necessary type hammers has been explained in connection with a specific example. It is obvious that all necessary hooks 63 will be enabled for any other particular example.

Type and type mounting

In order to effect printing of items or amounts a series of type are mounted on a circular arc in a manner such that they may move in the direction of the radius of the arc so that any one can be positioned on the printing line and they are each individually movable radially for impressing their indicia on the printing line. The type carrier 12 is provided with suitable means for attaching an arcuate shaped cover cup 113. Said cup 113 is provided with suitably sized and positioned notches for guiding each type 126 in a radial direction. Each type is provided with a spring 135 arranged between the lug 136 on the type stem and the inner wall of the cup 113 so that the type are normally held outwardly (see Fig. 11).

As has been mentioned herein this machine is of a size, heretofore unprecedented small size, therefore the platen 13 is of correspondingly small diameter, yet the type print substantially customary size characters. The printing zone is therefore substantially curved. Such has necessitated a new and novel form of radially movable type. The inner or printing face of the type is constructed on an arc, corresponding to the curvature of the printing zone as is illustrated in an enlarged and slightly exaggerated manner as shown in Fig. 11. Such exaggeration is introduced for more clearly illustrating the problem encountered. In this way I am able to effect the printing of characters which are sharp in outline instead of being blurred in the middle as would be the case if the customary straight-faced type were used.

Timing of totalizer

In order to effect the desired forms of computation the totalizer wheels must engage the actuators, at different periods of the directions of excursions of the said actuators. Thus for the purpose of adding amounts set up on the keyboard the totalizer remains out of engagement while the actuators are moving on the first or forward pull of the handle, said totalizer is then engaged with and remains in engagement with the said actuators on the return movement of the actuators until the said handle returns to about its normal position when said totalizer returns to its normal "out" position. In totaling the times of engagement and disengagement is the reverse of that for adding. Thus the totalizer is normally out of engagement with the actuators and when the handle has moved forwardly a short predetermined distance the totalizer is engaged with the actuators and remains in mesh therewith until substantially the end of the forward stroke of the handle when said totalizer is then disengaged from the actuators and remains disengaged on the return stroke of the handle. In taking a sub-total the totalizer is engaged with the actuators at substantially the same time as in a total taking operation and it then remains in engagement therewith until near the end of the return stroke of the said handle, when it is then disengaged therefrom. In a non-add operation the totalizer is normally in disengaged position and remains in disengaged position on both the forward and backward movement of the said handle. A detailed description of the mechanism of the above four recited periods of engagement and disengagement will now be given.

Mechanism for rocking the totalizer cradle

Figure 5:
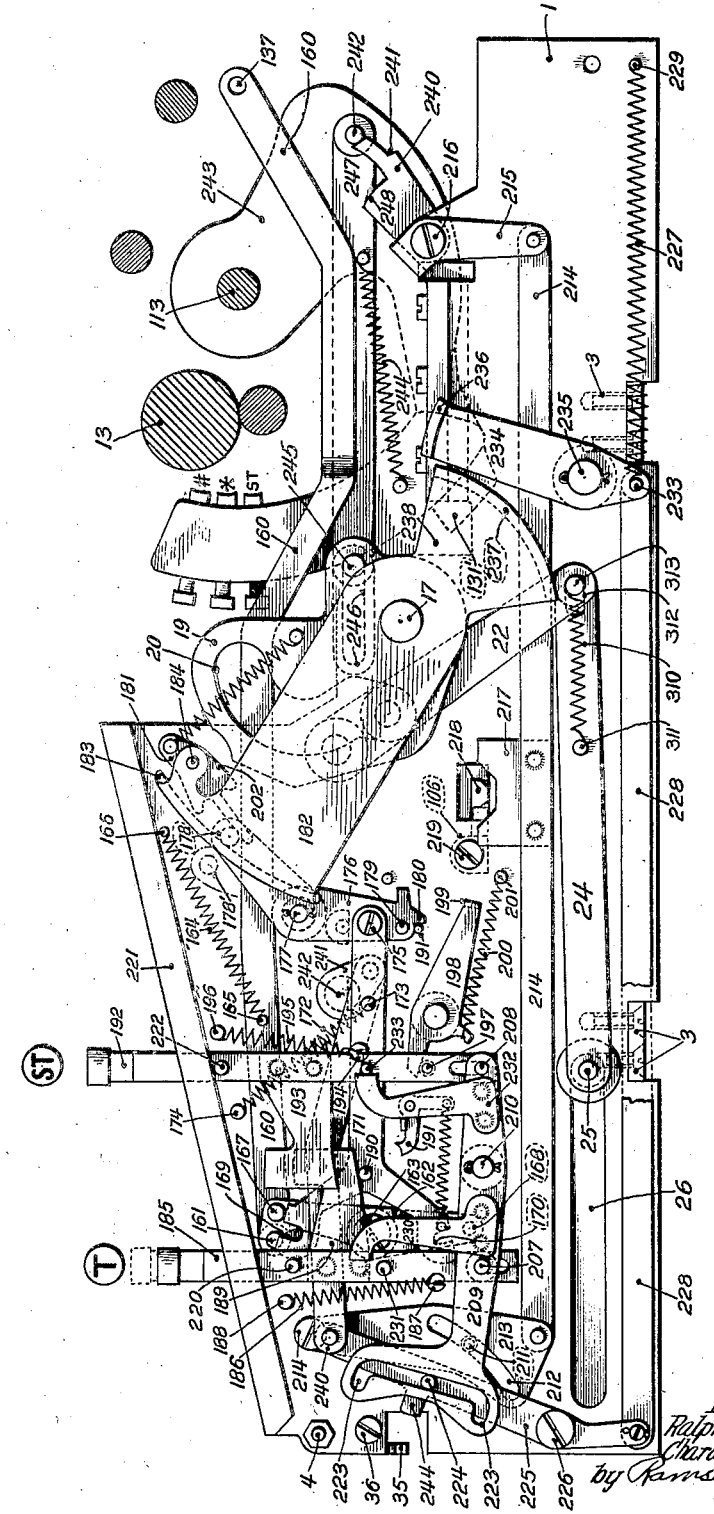
Fig. 5 is a view of that side of the machine which best shows the total key mechanism when the machine is at normal and the total key being partially depressed.
Figure 6:
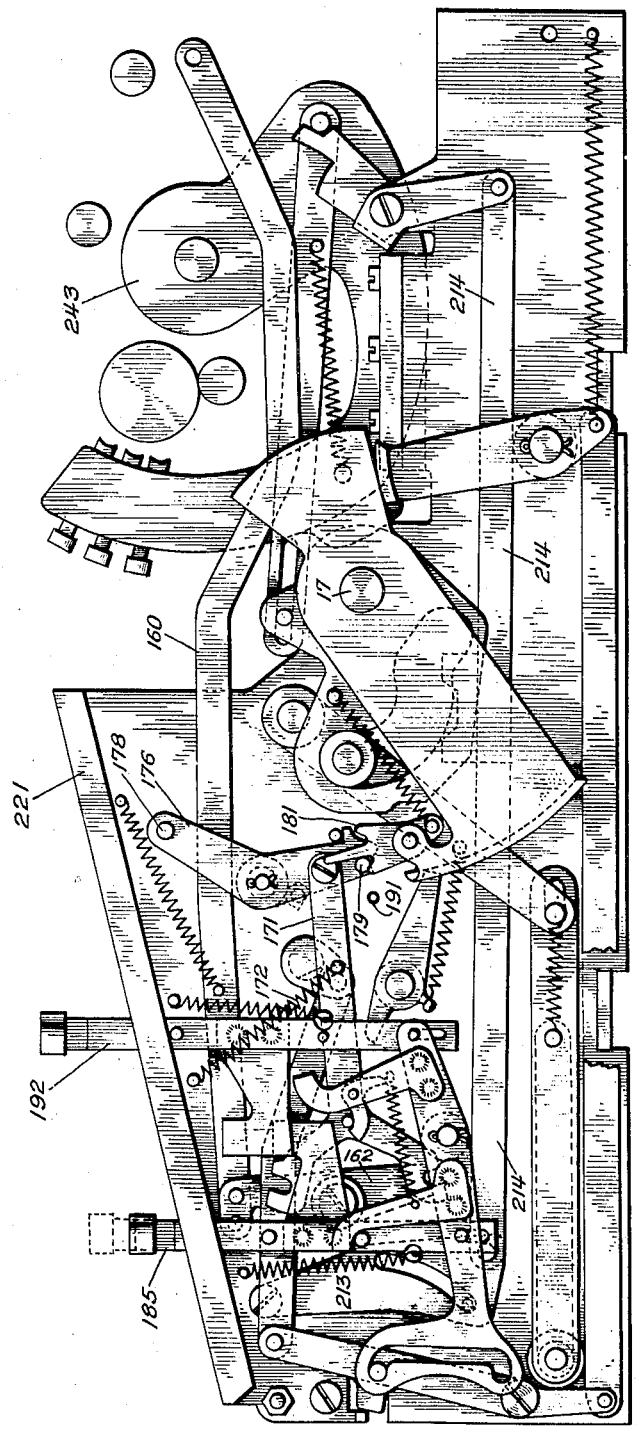
Fig. 6 is a view like Fig. 5 except that the parts have assumed a possible position during the operation of the machine.

In order to effect the different periods of engagement and disengagement above noted, the following mechanism best shown in Fig. 5 and 6 is provided. An offset link 160 extends between the shaft 137; which as hereinbefore noted is the shaft supporting the totalizer wheels 16 in the cradle 44; and the pin 161 at the upper end of the two-armed lever 162. Said lever 162 is provided with a suitable spacing hub and is mounted to turn freely to a limited extent on the main frame supported shouldered screw 163. Said two-armed lever is normally urged so that its upper end tends to move rearwardly under influence of spring 164 extending between the stud 165 fixed to the said link 160 and a stud 166 fixed to the main side frame of the machine. Said two-armed lever is provided with two studs 167 and 168 rigidly attached thereto, either of said studs may be engaged by suitable notches 169 and 170 respectively of the normally upwardly and forwardly spring urged pivoted pitman 171. Said pitman 171 has its notch 169 normally engaging the pin 167 of the said two-armed lever and is normally held in this position by the spring 172 extending between stud 173 fixed to said pitman and a stud 174 located fixedly to the main frame of the machine considerably above the center line of the said pitman. Said spring 172 has a force component opposing a similarly directed force component of spring 164, but the component of the latter spring is considerably superior to the opposing component of spring 172 so that even though both springs are acting on link member 160 the said member will move rearwardly unless prevented from so doing. Said pitman is freely pivoted on a stud 175 rigid with the two-armed lever 176 which is freely supported on a stud 177 rigid with the main side frame of the machine. Said lever is provided with a rigidly attached short pin 178 at its upper end, a rigidly attached long pin 179 attached at its lower end, and a trapezoidally shaped limiting and locking tooth 180 also at its lower end. Said two-armed lever 176 is adapted to be rocked about its pivot 177 by the straightening of a movable toggle comprising the spring urged wipe pawl 181 and its supporting plate 182 between either of the studs 178 and 179 and the main shaft 17.

The totalizer cradle is therefore normally rocked to its "in" and "out" positions by the co-operation of wipe pawl 181 cooperating with the short pin 178 and the long pin 179 thereby rocking the lever 176. Now lever 176 is connected through a series of links including pitman 171; two armed lever 162; and link 160 to the totalizer cradle 44. Lever 162 may therefore be considered as the totalizer cradle lever inasmuch as these two elements always move together. This mechanism resembles in a general way the corresponding mechanism of certain types of machines familiar to those skilled in this art, but the mechanism herein disclosed differs widely from such mechanism inasmuch as in the present instance the totalizer is normally out of mesh with the actuators instead of normally in mesh therewith, further the control of wipe pawl 181 by the special keys, as more particularly pointed out hereinafter, is also quite different.

Adding timing

The mechanism comprising link 160, lever 162, pitman 171, lever 176, the toggle members 181 and 182, and the springs 164 and 172 are the principal elements for variously rocking the totalizer cradle 44. During adding the said pitman 171 normally engages the upper pin 167 on the lever 162 and is resiliently held in this position by spring 172. In normal position link 160 assumes the position shown in Fig. 5, spring 172 is therefore tensioned to approximately its maximum extent and short pin 178 has the position 178' (indicated by dot and dash lines). Member 182 carrying wipe pawl 181 is suitably rigidly attached to the main shaft 17 so that when said shaft is rotated anti-clockwise as viewed in Fig. 5 the said plate and toggle is moved in a direction best described as generally downwardly. The above described positions of the short pin 178 is such that it is unmoved by the straightening of the toggle members comprising the spring urged wipe pawl 181 and its supporting plate 182. The totalizer therefore remains in its "out" or disengaged position during the forward stroke of the handle attached to the main shaft 17. Said plate 182 is provided with a turned over edge 183 having a height or depth of such dimensions as to permit short pin 178 to travel across its edge but will lock long pin 179 in a position corresponding to the dot and dash position of the short pin until said wipe pawl carrier has reached substantially its lowermost position; at this time the position of the wipe pawl is that shown in Fig. 6. It may be parenthetically remarked that wipe pawl 181 is mounted on a shouldered stud 184 with a spacing shoulder of a length sufficient to permit said wipe pawl to clear the locking edge 183 without interference.

When the said member 182 starts upwardly the toggle comprising itself and the wipe pawl 181 straightens and the long pin 179 is forced to the position shown in Fig. 5, whereupon it is locked in this position by the flange 183 integral with the said wipe pawl carrier 182 and remains in this locked position until said flange passes beyond said long pin 179. Two-armed lever 176 then snaps to a position corresponding to the dot and dash position 178' thereby disengaging the totalizer from the actuators, thus completing the adding timing cycle.

Hence in the normal adding cycle lever 176 remains stationary during the forward stroke of the handle inasmuch as such position represents the disengaged position of the totalizer, and the totalizer is rocked by wipe pawl 181 at near the beginning of the return stroke of the handle.

It is to be noted that there is; in so far as the totalizer cradle rocking mechanism is concerned; an appreciable amount of lost motion at the extreme positions of the operating handle. The time consumed in taking up the lost motion is utilized for effecting other functions as is more particularly pointed out hereinafter under the general heading of Main actuating mechanism.

Total timing

It has been hereinabove remarked that the timing for total taking is the reverse of adding timing. The taking of a total can therefore be effected by causing notch 170 of pitman 171 to engage lower pin 168 of lever 162. In order to effect such engagement the total key 185 is so constructed so to be suitably guided and constrained to move to an extent and in a direction substantially the same as that of the numeral keys. Said total key is normally urged upwardly by a spring 186 extending between a slotted pinch 187 thereon and the stud 188 rigid with the main frame of the machine. Said key is also provided with an extension 189 which when moved downwardly by a depression of the total key contacts with a stud 190 rigid with pitman 171, continued downward movement of the total key pushes said pitman downwardly stretching spring 172 a greater extent until notch 169 disengages pin 167 whereupon the pitman 171 snaps forwardly to the position shown in Fig. 5 carrying with it the two armed lever 176 to the position shown in said figure in full lines, until further movement is prevented by contact of tooth 180 with the fixed stud 191' mounted on the main frame. Continued downward movement of the total key causes the lower notch of the pitman 170 to engage the lower pin 168 on the two armed lever 162. When the handle is drawn forwardly the toggle comprising the wipe pawl carrier 182 with its wipe pawl 181 straightens after a predetermined idle movement shifting the pitman 171 forwardly thereby engaging the totalizers with the actuators, the totalizer is locked in engaged position by the interior surface of the flange 183 cooperating with long pin 179 until said flange passes beyond said long pin 179. At this time spring 164; which was stretched by the straightening of the toggle at the beginning of the forward stroke; tends to snap the totalizer to disengaged position and coincidentally move long pin 179 beyond the effective range of the straightened toggle at the initial return movement of the handle, whence the totalizer would be disengaged from and remain disengaged from the actuators at about the time printing should occur. The totalizer is incidentally locked in engaged position during the remainder of the forward stroke of the handle and during the initial portion of the return stroke by a suitably mounted spring pressed latch 191 engaging the said pin 190. Said latch 191 is mounted loosely on a stud rigid with the horn 232, and said latch is normally resiliently held in the position indicated in Fig. 5 by a suitably located spring extending between a suitably located stud on horn 230 and a suitably extending finger on the latch 191. The locking surface of the said latch is proportioned in such a way as to hold the pitman 171 in its lowered position by resiliently locking said pitman in its rearward position to the (at this time) relatively stationary member 232. On the initial return stroke of the handle wipe pawl 181 assumes the position shown in Fig. 6 so that continuance of the return movement of the handle causes a straightening of the toggle comprising members 182 and wipe pawl 181 thus forcing long pin 179 forwardly and forcibly disconnecting the resilient lock between pitman 171 and the relatively stationary member 232 by pushing pin 190 out of engagement with latch 191, thus disengaging the totalizer. Full return of the handle completes the totaling cycle.

Sub-total timing

It has been hereinabove remarked that sub-total timing consists of engaging the totalizer with the actuators and keeping it there during both the forward and return strokes of the operating handle. A mechanism quite similar to the total key 185 is provided for effecting the sub-total cycle. A sub-total key 192 having substantially the same movement as the total key 185 is provided. Like the total key the sub-total key is provided with an integral extension 193 for lowering pitman 171, disengaging it from upper pin 167, and engaging it with lower pin 168. Said key is also provided with a slotted pinch 194 from which extends a spring 195 to a fixed stud 196. Said sub-total key is provided with a pin 197 near its lower end which when moved downwardly permits the rearwardly extending spring urged arm 198 to carry its comparatively long bent over portion 199 to travel upwardly into contact with the lower edge of two armed lever 176 to the rear of the limiting and locking trapezoidally shaped tooth 180 by virtue of the tension in the spring 200 extending between a finger on said member 198 and a fixed stud 201. Straightening of the toggle comprising the wipe pawl carrying plate 182 and its wipe pawl after a predetermined extent of forward movement of the handle causes the totalizer to be engaged with the actuators. The totalizer is then locked in this position by the cooperation of the flange 183 with long pin 179 and additionally by the turned over portion 199 cooperating with the forward side of the trapezoidal shaped tooth 180. At the initial return stroke the toggle comprising wipe pawl carrying plate 182 and wipe pawl 181 is prevented from straightening because the turned over portion 199 cooperates with the surface 202 of the wipe pawl preventing its shoulder cooperating with long pin 179, hence the totalizer remains in engagement with the actuators on the return stroke of the handle, thus completing the sub-total timing cycle.

It is thus seen that the sub-total control of the totalizer is substantially the same as the totaling control except that the combined latch and pawl disabling finger 199 is interposed in the path of the wipe pawl 181, thus disabling the said pawl. Therefore when the totalizer is meshed with the actuators at near the beginning of the forward stroke of the operating handle it remains in mesh therewith until the said sub-total key is released near the end of the return stroke of the handle. In this way an amount which stands on the totalizer wheels is transferred to the printing mechanism then retransferred to the totalizer so that other additions can be summed with those resulting in the printing sub-total.

Non-add timing

It has been hereinabove remarked that during a non-add operation the totalizer remains out of engagement on both the forward and return strokes of the operating handle. In order to effect this cycle there is provided a non-add key 203 (Figs. 21 and 22) which has a movement similar to that of the total keys. Said non-add key is provided with a slotted pinch to which is attached one end of a spring 204 the other end of which is attached to the stud 205 fixed to the main side frame. The non-add key does not effect an interchange of pitman engagements with pins 167 and 168 as do the total keys, therefore the totalizer will have potentially the same movement as in an adding cycle. Said non-add key is provided with turned over flange 206 near its lower end to prevent the straightening of the toggle comprising the wipe pawl carrying plate 182 and the wipe pawl 181 in a manner similar to that effected by the flange 199 during a sub-total cycle. Therefore since the short pin 178 has the dot and dash position 178' at the beginning of the forward stroke of the handle it will retain such position during the non-adding stroke as it did during the adding cycle. At the initial return stroke the flange 206 disables the normal straightening of the toggle as in the sub-total cycle so that the totalizer will remain in disengaged position during the return stroke, thus completing the non-add cycle.

Restoring after a total cycle

As noted under the description of the total cycles depression of a total key caused the upper notch 169 of pitman 171 to be disengaged from upper pin 167 on lever 162, and that when such disengagement occurred spring 172 caused the pitman to snap forward a distance predetermined by the location of pin 191'. When the total keys are released (see total key release) the pitman 171 would assume substantially the position shown in Fig. 5 that is out of engagement with the upper pin 167 by virtue of the tension in spring 172. Under such condition two-armed lever 162 is in the position shown in Fig. 5. Hence when the handle is drawn forwardly the toggle comprising pawl carrying plate 182 and wipe pawl 181 will be straightened after the hereinbefore mentioned predetermined idle movement thus moving short pin 178 from the full line position to the dot and dash line position, hence drawing the pitman 171 rearwardly sufficiently for its upper notch 169 to engage upper pin 169 and thus complete the normal connection for the normal adding cycle after either total key has been released.

Releasing the zero stops by the total keys

When a total is printed it is desirable to print an identifying sign or character in juxtaposition with the printed amount to identify said amount as a total or as a sub-total. For accomplishing this function each of the total keys is provided with elongated slots at their lower ends; extending through these slots are the pins 207 and 208 rigidly attached to the lever 209 which is pivoted loosely upon a shouldered stud 210 rigid with the main side frame of the machine. The depression of the total key 185 will rock the forward end of the said lever 209 downwardly, and the pin 211 rigid with said lever will accordingly travel downwardly in the inclined slot 212 in member 213 which is suitably offset and loosely pivoted on the shouldered stud screw 214 threaded into a suitable hole in the main side frame. Attached to the lower end of the said member 213 is a long offset link 214' extending rearwardly and supported at its rear end by an offset lever 215 supported to turn freely on a long stud 216 screw threaded into a tapped hole in the secondary side frame 5. Near the middle of the said link 214' is attached a double acting cam 217 which when moved rearwardly upon the full depression of the total key causes the extension 218 of the hinged plate or bail 106 to ride up the forward slanting surface of said cam. The said plate or bail 106 is hinged by dowel screws 219 near each end to the main side frames of the machine, one of said dowel screws in each main side frame. The rear edge of said plate or bail 106 extends beneath the shoulders 105 of all the denominational zero stops 96 (see Figs. 1 and 2). The cam 217 is so constructed as to cause the zero stops 96 to be elevated sufficiently to free the rack actuators 106' so that they may travel forwardly until stopped by the square shoulders of the single teeth 147 rigid with the totalizer wheels 16 coming in contact with the substantially radially directed surfaces of the trip levers 148.

When the sub-total key 192 is fully depressed substantially the same action as above described takes place because the forward end of the lever 209 travels upwardly, thus swinging member 213 forwardly and consequently link 214′ also moves forwardly hence cam 217 disables the zero stops 96 in substantially the above described manner.

*Locking the total key in depressed position*

As has been noted herein the pitman 171 is normally drawn upwardly by tensioned spring 172 it is therefore necessary to hold this spring in tensioned position when such tension is imparted thereto by depression of either total key. Such tension in spring 172 can conveniently be maintained by temporarily locking the total keys in depressed position. The total key 185 is normally held in raised position by a spring 186 extending from the slotted pinch 187 to a stud 188 fixed on the main side frame, further the said key may be limited in its upward movement by a stud 220 rigid therewith and normally contacting with the lower surface of the upper keyboard plate 221. Similarly the stud 222 rigid with the sub-total key 192 is held in contact with the said plate by a spring 195 extending from a slotted pinch to the stud 196. When both the total keys are in normal position the hereinbefore mentioned lever 209 is in a central position and is held in such position by pins 207 and 208 extending into slots in the total keys and the springs 186 and 195. The extreme forward end of lever 209 has a double bayonet slot 223 through which extends a stud 224 rigid with pivoted lever 225 holding said lever in a rearward position as shown in Fig. 6. Said lever 225 is freely supported by suitable means such as the shouldered stud screw 226 attached to the side frame and its upper end is urged forwardly by a spring 227 attached to a stud at the rear end of link 228 attached to the lower end of said lever 225. When the forward end of lever 209 is rocked downwardly by full depression of the total key 185 the slot 223 slightly moves the pin 224 forwardly and spring 227 snaps the upper end of lever 225 forwardly until stud 224 lies in the upper horizontal part of the double bayonet slot 223 of said lever 209. Said lever 209 is provided with a horn or extension 230 which passes over pin 231 rigid with the total key 185. Thus pin 224 is enabled to lock the total key in depressed position. Similarly the sub-total key is held in depressed position by the rocking of the forward end of lever 209 upwardly until spring 227 is enabled to force pin 224 into the lower horizontal part of the double bayonet slot 223 and horn or extension 232 rigid with lever 209 passes over the pin 233 rigid with the sub-total key 192. Hence either total key is locked in depressed position by stud 224.

The hereinbefore mentioned suitably supported spring urged latch 191 is carried by a suitably located supporting means on the horn 232. Therefore when the total key 185 is depressed the lever 209 has its forward end rocked downwardly thereby carrying latch 191 forwardly into proximity of the pin 190 so that the parts may be latched together.

*Interlock between the total keys and handle*

It is desirable to prevent the main handle from moving if a total key is only partially depressed and to prevent depression of a total key after the handle has moved from normal position. As has been noted herein the depression of either total key rocks lever 209 either upwardly or downwardly and pin 224 travels slightly forwardly during such depression thereby permitting or causing link 228 to travel rearwardly with the assistance of spring 227. Said link 228 is attached to a stud 233 rigid with a lever 234 loosely pivoted on a shouldered stud 235 rigid with the main side frame. Hence lever 234 partakes or tends to partake a movement corresponding to the movement of lever 225. Said lever 234 has a turned over flange 236 which is normally out of the path of an oppositely directed flange 237 rigid with a sector 238 fixed to the main shaft 17 of the machine. If the main shaft is moved from normal the flange 237 is in the path of flange 236 hence lever 225 cannot be moved because lever 234 is locked, hence the total keys are locking against full depression and hence against effective positioning. Similarly if either of the total keys are only partially depressed flange 236 is interposed into the path of flange 237 thus locking the main handle against movement. However, when either total key is in fully depressed position pin 224 is at the extreme forward end of the horizontal part of the double bayonet slot 223 and the corresponding position of flange 236 is forward of the path of flange 237 and hence the main handle is free to be moved for operating the machine.

*Interlock between number keys and total keys*

It is desirable to prevent a total key from being depressed when any numeral key is depressed and also to prevent the depression of any numeral key when a total key is depressed. For the purpose of effecting such interlock the lever 225 is connected at its upper end to a link 240 extending from a crank 241 rigid with a flattened shaft 242 (see also Figs. 1 and 2). It has been noted hereinabove that the slides 38 and 83 cannot be moved if shaft 242 is partially rotated, and further the said shaft cannot be rotated if any of the slides have been moved. Hence since shaft 242 is turned by the movement of lever 225 which in turn is moved by either total key, said total keys lock the numeral keys against depression, and also if any numeral key is depressed the shaft 242 cannot be rotated. Hence the total keys will not remain in depressed position because shaft will not permit link 240 to move forwardly thereby holding lever 225 and pin 224 stationary thus pin 224 cannot move into either horizontal part of the double bayonet slot 223.

*Automatic release or depressed total keys*

As has been noted herein the total keys when fully depressed are locked in such position, therefore the said total keys should be released when either total cycle is completed. Manifestly the total keys will be released if the pin 224 is moved out of either horizontal part of the double bayonet slot 223 in member 209 thus permitting either of the springs 186 or 195 to restore the corresponding key to normal position. In order to effect such movement of pin 224 the lever 225 is provided with a projection 244 extending forwardly into the path of the plate or bail 35 which as has been hereinbefore pointed out is rocked near the end of the return stroke of the handle to push the key locking slides 38 rearwardly to release the numeral keys 90. Likewise said bail or plate 35 pushes the projection 244 and lever 225 rearwardly a sufficient distance to move pin 224 out of either horizontal part of the double bayonet slot 223 thereby releasing either of said total keys.

*Main actuating mechanism timing relations*

For the purpose of driving the totalizer amounts corresponding to the set numeral keys and recording such amounts or for printing a total from the totalizer as well as for effecting the necessary timing of the various auxiliary mechanisms such as ribbon feed, paper feed, key release etc. there is provided a means for driving the main shaft 17 manually in one direction and automatically in the reverse direction.

The manual means for driving the shaft 17 may conveniently take the form of a handle 9 rigidly attached to said shaft 17 as is clearly shown in Fig. 16. The said main shaft 17 is provided with a series of cams and projections as shown in said Fig. 16. These cams and projections have been generally described in connection with auxiliary mechanisms operated thereby and here they will be described more particularly with a view of giving their relative timed relations, and in substantially the order in which they first function.

The earliest acting (or non-acting) element on the main shaft is the lock therefor controlled by the total keys, namely flanged sector 238 rigidly attached to said shaft 17 (see also Figs. 5 and 6). As hereinabove noted if either total key is only partially depressed flange 236 is in the path of flange 237 and the shaft 17 is accordingly locked against operation. If on the other hand neither total key is depressed or either is fully depressed, this lock is disabled.

As soon as the shaft has moved appreciably the projection 71 rigidly attached to said main shaft (see also Figs. 3 and 4) rocks floating lever 70 to restore tripped transfer elements and restores the actuating sectors 14 which may have moved an extra tooth distance during the proceeding operation through the link mechanism 69, 68, 67 and cranks 65 and 66 as hereinabove described. Such movement is fully completed prior to any movement of the type carriers or of elements 106'.

At substantially the same time as the mechanism described in the preceding paragraph begins to operate, lever 55 carrying the platen feed pawl 56 rises under the influence of its spring due to the raising of stud carried by arm 54 rigid with the main shaft 17. This particular timing of the said paper feed pawl is not necessary at this time but such timing is used because of the remarkably simple mechanism which can be utilized for accomplishing this incidental but important function. The turning of the platen is, however, not completed until about the end of the return stroke of the handle as hereinabove noted.

At about the time the pawl 56 is fully positioned the full stroke pawl 72 engages the nearest notch 73 in the periphery of cam element 19 to lock the handle and shaft 17 against return movement.

Soon after the full stroke pawl has engaged the first notch 73 the spring urged pawl 27 mounted on cam element 19 passes the projecting nose 31 of the bell crank 31—32 connected with the key release mechanism, which includes link 34 and bail 35. Like the paper feed pawl 56 the pawl 27 is merely positioned for effecting a movement near the end of the return stroke of the shaft 17.

At about this time wipe pawl 181 (see Figs. 5 and 6) has come into contact with short stud 178 preparatory to forcing it to the position 178', (if the operation is one involving a depressed total key) otherwise the said wipe pawl is merely rocking idly about its pivot 184. Translating this movement into functions, the totalizer is engaged with the actuators to partake of their forward movement if the operation is a totaling one, or the totalizer is left in its disengaged position for other operations.

At about the time wipe pawl 181 is in position to move short pin 178 drum cam 58 begins to move stud on lever 59 in a generally transverse direction to feed the inking ribbon forwardly or to position the ribbon feeding pawl for feeding the ribbon according to the position of the ribbon reverse mechanism.

When wipe pawl 181 has reached a position corresponding to that of having forced short pin 178 to the position 178' the peripheral flange 183 is then ready to pass long pin 179 with its interior surface in contact with said pin.

At this time the following functions have been completed; tripped transfers are restored to normal; any actuating racks which were in abnormal position are restored to normal; the shaft 17 is locked against return movement; feeding of the ribbon may have been effected; the totalizer is either locked out of engagement or has been rocked into engagement and locked in such position; the platen feeding pawl has been positioned for feeding the paper at a later time; and the key release mechanism is set for acting at a later time; therefore the totalizer wheel actuators are ready to move and the numeral keys are ready to be locked against release or depression.

As herein noted the actuators move under the action of springs 110 when bar 25 is moved forwardly. It will be remembered that said bar 25 is connected by links 24 to arms 22 and that said arms are moved by the co-operation of the camming surfaces of slot 20 in cams 19 fixed to the main shaft 17. Up to this time rollers 21 have been in a dwell in said cam slots and now they are positively moved so as to tend to stretch springs 110 and thus move members 106' so that they will eventually assume positions determined by the depressed numeral keys, if any are depressed, or will move as far as permitted when a total key is depressed.

When bar 25 starts on its forward excursion bell crank lever 49 (see Figs. 3 and 4) is then free to move under the influence of spring 49' whence flattened shaft 48 partially rotates to lock the numeral keys in the positions which they may have at this time.

After the totalizer wheel actuators and the connected type sectors have moved a distance corresponding to about that of circular pitch of the totalizer wheel the members 130 have determined which of the hammers 18 are to be cocked then projection 61 rigid with said shaft 17 begins to move the frame 62 by contacting with shaft 120 thereby carrying hooks 63 downwardly to cock the selected hammers.

At about the time that the hammers are half-cocked rolls 21 reach the dwell in the cam slot 20 which is near the periphery of cam member 19 and the bar 25 remains stationary in its extreme forward position and during this time the printing hammers are released as hereinabove described to strike their percussive blow on the now positioned type.

At about the time the printing hammers are released the wipe pawl 181 (see Figs. 5 and 6) has had its pivot 184 carried past the long pin 179 so as to be in position to force said long pin forwardly and the flange 183 has passed said long pin 179 thereby unlocking the same for actuation (if such should occur) by the straightening of the toggle comprising wipe pawl 181 and plate 182.

Just before the extreme end of the forward stroke of the main operating handle full stroke pawl 72 (see Figs. 3 and 4) has passed by and the extreme edge of cam member 19 and assumes a central position thereby unlocking said cam member 19 so that it may return to normal position, but coincidentally lock said member against forward movement until said handle has reached its home or normal position.

It is usual in machines of this general type to return the handle automatically, in order to secure such automatic return a strong spring 240 is located between a suitable stud 241 fixed to one of the cam members 19 and a suitably located stud on the main frame of the machine. When the main handle is pulled forwardly said spring is stretched and when the handle reaches its extreme forward position then released said spring 240 returns the above mentioned parts to normal position.

While the rolls 21 are in the dwell of cam member 19 on the return stroke wipe pawl 181 acts on long pin 179 (if the operation is such as to require such movement) and shifts the totalizer to a predetermined position as described hereinabove, such action is possible as locking flange 183 is below said long pin 183, but after such pin has been moved said locking flange comes into play to maintain the totalizer in its shifted position as long as the members 106' are being moved, or; what amounts to the same thing; as long as universal bar 25 is travelling.

After said flange 183 has released long pin 179 and bar 25 has assumed a stationary position pivoted pawl 27 (see Figs. 3 and 4) contacts with under surface of the projection 31 of bell crank levers 31 and 32 to operate the key release mechanism.

At about the time said key release mechanism is moving projection on arm 54 is moving the platen feeding pawl 56 downwardly to partially rotate the platen for feeding the paper forward preparatory to receiving another printing impression. During this time projection 71 is moving past spring urged pawl 70 to be in position to restore the transfer mechanism to normal position at the beginning of the next forward stroke of the operating handle as has been briefly described hereinabove. At about this time pin on arm 59 passes off the high part of drum cam 58 to complete the ribbon feeding preparatory of the next operation of the machine.

Printing special signs

When printing under the control of the total keys or under control of the non-add keys it is desirable to print special arbitrary designating signs in connection with the quantities printed.

It has been noted hereinabove that depression of the total key 185 causes the link 214' to travel rearwardly and hence arm 215 partakes of the same character of movement about pivot 216 causing number 240 to travel upwardly as indicated in Fig. 6 thereby positioning shoulder 241 in the path of stud 242. Said stud 242 is rigidly attached to a special type carrier 243 provided with three special type as is indicated in Figs. 5 and 6 for printing the special arbitrary signs hereinabove noted. Reference character 245 represents a stud rigidly attached to one of the cam members 19 which can travel freely in a slot 246 in member 247 pivotally attached to special sector 243 sufficient clearance being provided to avoid interference. Said special sector is urged to rotate about shaft 113 by a spring 244' extending between a suitable stud rigid with link 247 and a suitable stud attached to the immovable side frame of the machine.

Assuming the total key 185 depressed; as is indicated in Fig. 6; and the machine operated, the member 240 is moved so that shoulder 241 is in the path of pin 242 and when the handle moves forwardly stud 245 travels with member 19 thus permitting spring 244' to rotate the special sector 243 an extent determined by the location of shoulder 241 whence the total sign type is positioned for printing. Said special sector is also provided with a cam 131' for causing a printing hook 63 to cock a printing hammer 18 in the same manner as in the case of the numeral type carriers. Hence positioning of the special type automatically causes the cocking and releasing of a printing hammer the same as in the case of the hereinabove described numeral type. When spring 244' moves sector 243 link 247 partakes of a corresponding movement. When the main shaft returns to normal pin 245 engages the rearward end of slot 246 in link 247 thus restoring special sector 243 to the position indicated in Fig. 5.

When printing a sub-total member 240 is moved in a direction opposite to that just described thereby positioning shoulder 248 in the path of pin 242; because of the opposite direction of movement of link 241'. Due to the different level of shoulder 248 a different special type will be positioned for printing, in the particular case considered the special type will be that designating a sub-total. The special sector 243 is returned to normal as pointed out hereinabove.

Normally a shoulder holds pin 242 in the position indicated in Fig. 5 so that during the listing of items cam 131' is in a position such that the printing hammer associated with sector 243 will not be withdrawn as in the case of the item types when unnecessary zeros are to be eliminated.

Error key

Occasionally a key or keys on the keyboard are inadvertently depressed and the operation of the machine would cause an operation not intended or an erroneous quantity would be calculated and printed. In order to guard against such contingency an error key is provided to release any inadvertently depressed key or keys. It is to be understood that the numeral keyboard is of the type commonly known as flexible but an error key is provided to release the entire array as may be desirable on occasion.

To accomplish such function there is provided the error key 260 which is guided by the top of the keyboard as are the other keys herein described. Said key 260 is connected by suitable means as the stud or screw 261 to a two armed lever 262 loosely pivoted on a stud fixed to the main frame of the machine. Said key is normally held in raised position by a spring 263 extending between a stud 264 fixed to the main frame and a stud 265 fixed to the said two armed lever, the lower arm of said two armed lever is adapted to contact with a stud 266 fixed to the offset link 34; which will be remembered is the link which is automatically moved rearwardly near the end of the operation of the machine to release the numeral and certain other keys; so as to move said link rearwardly when the said key 260 is depressed.

A stud 267 is suitably placed so as to limit movement of arm 262 when the said key 260 is depressed and thus guard against unnecessary movement of the key release mechanism.

Printing non-add sign

The non-add mechanism is in the nature of a detachable adjunct, that is to say, it may or may not be included in the complete assembly. Further the non-add may be provided as a simple detachable adjunct which does not print a designating sign, such as the mechanism described hereinabove in connection with Fig. 22. The mechanism for printing a non-add sign is illustrated in Fig. 22. The timing of the totalizer for effecting the non-add function is substantially identical with that described hereinabove and need not be described again.

It will be remembered that the total keys are constructed so as to cause a pin 211 to travel upwardly or downwardly in slot 212 in member 213 and cause a link 214 to move either rearwardly or forwardly. This construction is preserved in principle in the mechanism illustrated in Fig. 22. The mechanism of Fig. 22 differs from that illustrated in Figs. 5 and 6 in that the rear end of link 214 is adapted to be effectively lengthened under the control of the non-add key 203. To effect this function link 214' differs from link 214 in having an open fork or an elongated slot through which extends the pin in the lower end of arm 215. Pivoted on said pin is an element 250 provided with a cam slot 251 fitted about a pin 252 and which is rigid with link 214' and is also provided with a pin 253 extending through a slot 254 in the lower end of the non-add key 203. Said slot 254 is of sufficient length to permit link 214' and member 250 to move forwardly or rearwardly an extent predetermined by the movements of member 213 without interference by the non-add key. When the non-add key 203 is depressed pin 253 is carried downwardly and cam slot 251 causes member 250 to move forwardly thereby swinging arm 215 forwardly a corresponding amount thereby positioning shoulder 255 in the path of pin 242 so that a distinguishable sign may be printed in juxtaposition with the non-add item in substantially the same manner as described hereinabove in connection with the total keys. Manifestly slot 251 may be formed so as to cause member 215 to move rearwardly upon depression of the non-add key 203. Such a shape for said slot will manifestly require a corresponding relocation for shoulder 255 so as to cause the special type sector to position the non-add sign.

Repeat key

Occasionally it is desirable to disable the mechanism which normally operates to release the keys at about the end of the return stroke of the operating handle as that those keys depressed will remain depressed for an indefinite number of operations of the main operating handle.

In order to secure this result a key 270 (see Figs. 3 and 4) is guided by the upper surface of the keyboard and said key is attached by suitable means such as a screw or rivet 271 to one end of a bell crank lever 272 loosely pivoted on a stud rigid with the main frame of the machine. Said key is normally held in its upper position by a spring 273 extending between a stud 274 fixed to the main frame and a lateral extension 275 integral with said keys 270. Said key is also provided with a notch 276 near its upper end. It is seen that said spring 273 tends to force said key 270 to rotate about the point designated by reference character 271. Such rotation is normally prevented by the rearward edge of said key contacting with the wall of the slot formed in the upper keyboard frame. When said key 270 is depressed said slot 276 is in a position to permit a limited rotatory movement of said key so as to automatically lock said key in fully depressed position by engaging pin 277, or other suitable anchoring means.

When said key 270 is depressed said bell crank 272 is rocked about its pivot 278 and turned over flange 279 thereon is raised to a position such that the upper end of said flange occupies that of an arc nearly tangent to the extreme periphery of cam member 19 so that the nose 33 of the pivoted pawl 27 is forced radially a sufficient extent to prevent co-operation with the projection 31 of the bell crank lever 31—32 at the time that such co-operation would normally occur.

Said key 270 is provided with suitable means such as a stud 280 which limits upward movement of said key 270 and said stud may also serve as means to unlock said key when the error key is depressed as will be more fully described hereinbelow in connection with the modified error key.

Ink ribbon mechanism

In machines of this class it is usual to provide a suitable mechanism for feeding and reversing the inking ribbon. In the present instance, due in part to the small size of the machine and the compactness of the parts the ink ribbon mechanism is made peculiarly compact, simple and reliable in operation.

As has been indicated hereinbefore segmental drum cam 58 (see Figs. 16, 24 and 25) is rigidly attached to the main shaft 17 and consequently moves therewith. Said cam 58 is provided with two levels; as has been pointed out hereinabove; on which a suitable pin or anti-friction roller 61 may have different relative positions. The relative position of said pin or anti-friction roller from the one level to the other gives an element 59 an oscillating motion which is utilized for feeding and reversing the inking ribbon.

Referring particularly to Figs. 24 and 25 element 59 is loosely pivoted on the shaft 266 and carries an extension 267 to which is pivoted a spring pressed pawl 268. Pawl 268 is adapted to engage either of the notches 269 or 270 near the periphery of member 271 said member being also loosely pivoted on said shaft 266. Spring 272 attached to said pawl 268 is comparatively strong; the strength of said spring is of a magnitude such that pawl 268 does not snap from one notch 269 to the other notch 270 readily, in fact such snapping occurs only when member 271 is restrained from movement in the direction of the movement of said pawl 268.

Supported by suitable brackets 273 and 274 attached to the rigid frame work of the machine are two rotatable shafts 266 and 275. Attached to each of said shafts are the fine toothed racket wheels 276 and 277. Said shafts 266 and 275 are provided with means such as rigidly attached collars for engaging ribbon spools 278, which are accordingly driven by said shaft.

Loosely pivoted on said shafts 266 and 275 are the pawl carrying levers 271 and 278 respectively. Said levers are permanently connected by a link 279 so that oscillating movement of the one is communicated to the other. Lever 271 is provided with an extension in which the above mentioned notches 269 and 270 are located. Therefore when member 267 carrying pawl 268 is oscillated such oscillation is communicated to lever 271 and thence through link 279 to lever 278. Each of the connected levers 271 and 278 carry spring pressed pawls 280 and 281 respectively adapted to engage with the teeth of the respective ratchets 276 and 277. Each of the brackets 273 and 274 are provided with extensions 282 and 283. Said extensions are in the vicinity of that portion of pawls 280 and 281 engaging the ratchet wheels 276 and 277. Only one of the pawls 280 or 281 is permitted to engage its respective ratchet. The construction and arrangement is such that (say) pawl 281 carried by lever 278 is in engagement with its ratchet 277 then pawl 280 carried by lever 271 is held out of engagement with its ratchet by the above noted extension 282 of bracket 273. Therefore only one of the ratchets can be driven by the main shaft 17.

Two spring pressed pawls 284 and 285 are supported by brackets 273 and 274 respectively to prevent backward rotation of the corresponding associated ratchet wheels. Manifestly while pawl 281 associated with lever 278 is in condition to actuate its associated ratchet wheel hold back pawl 284 must be disabled and vice versa. In order to accomplish this function lever 271 is provided with a cam having two different levels 286 and 287, similarly lever 278 is provided with a cam having the two different levels 288 and 289. When the active point of pawl 284 is on level 287 the corresponding point of pawl 285 is one level 288 and vice versa. Levels 287 and 289 have radii slightly greater than the addendum radii of the corresponding ratchets, and levels 286 and 288 have radii approximating the dedendum radii of the respective ratchets. Hence only one of the two pawls 284 and 285 can actively engage the corresponding ratchet.

When the ribbon is completely unwound from one of the spools movement of lever 267 meets opposition whence pawl 268 passes from notch 269 to notch 270. Such passing shifts level 287 on lever 271 from beneath pawl 284 and shifts level 289 under pawl 288 thus reversing the effectiveness of the hold back pawls.

The ratchet driving pawls 280 and 281 are enabled and disabled in a similar manner, inasmuch as they are carried by levers 271 and 278 shifting of said levers by the interchange of the notches 269 and 270 causes fixed projections 282 and 283 on brackets 273 and 274 to reverse the effectiveness of said pawls 280 and 281. Roller or pin 61 is held in contact with the periphery of cam 58 by a suitable spring 268' suitably attached to arm 267 which is integral with arm 59 carrying said member 61 and extending to a convenient point on the main frame.

One way of readily visualizing the operation of this ribbon mechanism is to assume a normal hypothetical position for link 279 and its attached levers 271 and 278. Such position corresponds to that where the hold back pawls 284 and 285 are "half-way" disabled on the rises between the associated levels; and similarly feeding pawls are "half-way" disabled by the shoulders 282 and 283. When the ribbon is feeding in one direction said members 279, 271 and 278 travel to the right from the assumed hypothetical position then back to said position. When the ribbon is feeding in the opposite direction the said members 279, 271 and 278 travel to the left of the assumed hypothetical position then back again. Manifestly the direction of movement of the ribbon depends upon the position of pawl 268 with respect to notches 269 and 270.

Service register

Hereinabove the desirability of a service register has been noted. Such a register may take the form of a suitably located consecutive item counter or register 256 (see Fig. 22) which may be located in a suitable place on the machine, as for example on the ledge 257 just inside the main case of the machine. A suitable counter or register may be provided with a lever 258 for actuating the counting wheels. Connected to said lever is a link 259 provided with a slot 260, through which extends the pin 245 hereinabove mentioned. The slot 260 is of such length as to cause pin 245 to shift link 259 to extent sufficient to cause lever 258 to actuate the counter sufficiently to cause a registration of one unit on the item counter. Thus registering the number of oscillations of the main actuating mechanism of the machine.

Dash pot

In machines of this class it is usually regarded as desirable to make provision for considerably increasing the normal resistance tending to prevent actuation of the main handle if an attempt is made to operate the same at an undue speed.

Such a speed responsive governor is illustrated herein as dash pot. Said dash pot extends between the stud 293 fixed to the main frame and the movable stud 290 fixed to one of the cam members 19. Said dash pot consists of a cylinder member 292 and a piston member 291 adapted to reciprocate therein (see Fig. 25). Said cylinder is partially filled with a suitable viscous liquid such as for example a mixture composed of glycerin and alcohol, or castor oil and alcohol. The speed of the main handle return may be controlled by presetting a value in the piston in any well known manner.

Alternatives

It is sometimes desirable to omit certain elements, or to substitute other elements for those hereinabove described. Members which may be omitted or which may have others substituted therefor are shown as attached with cotter pins. Most of the elements which it is contemplated to remove entirely or have others substituted therefor are illustrated in Figs. 5 and 6.

Members 228 and 234 have been herein described as locking the main handle if either of the total keys have been incompletely depressed. If desired both these members may be removed by merely removing the cotter pins securing these members in place. The removal of these members eliminates the hereinabove described function.

Member 209 has been described as a means for locking the total keys in depressed position. This member may be removed and the corresponding element shown in Fig. 17 substituted therefor. The member 209 shown in Fig. 17 is provided with an extension 296 having an irregular slot 297 formed therein. When said member of Fig. 17 is substituted in the machine an extension of the shutter 35 fits into the irregular slot 297 in such a manner that the extension occupies substantially the middle of said slot towards the forward end. Hence if either total key were depressed, and at the same time certain of the numeral keys are also depressed the said numeral keys will be released by the depression of said total keys because the slanting face of slot 297 will shift the key release shutter 35 rearwardly to release any depressed numeral keys.

Again member 209 as shown in Figs. 5 and 6 requires a full depression of the total keys to permit pin 224 to enter either of the horizontal parts of the double bayonet slot 223. If a member 209 as illustrated in Fig. 18 be substituted therefor the total keys will be held in depressed position even though they are not given the extreme amount of depression of which they are capable because the square form of pin 224 will securely lock on the squared upper or lower end of the formed projection on said member.

The mechanism described hereinabove is such that the numeral keys are locked against depression when a total key is depressed. This locking is effected by link 240 and flattened shaft 242. If desired to eliminate this lock said shaft 242 and link 240 may be removed or omitted in the assembly of the machine.

Again member 49 has been described as operating to lock the numeral keys in assumed positions after the machine has started to operate. Such locking occurs only after universal bar 25 has traveled an appreciable extent. Said keys may be locked sooner if desired by substituting the mechanism shown in Fig. 20. The flattened locking shaft adapted to be moved by spring urged arm 49 may be replaced by arm 298 fitted to a similar mutilated or notched shaft. Said arm 298 is adapted to be held up by pin 29 on sector 19 against the action of spring 299. When the sector 19 descends upon an operation of the main handle arm 298 rotates under the influence of spring 299 and thus locks the numeral keys in assumed position at an earlier epoch. Pin 300 forms a limit stop for arm 298 so that pin 29 will reengage said arm on the return movement.

Again locks operated by flattened shaft 242 and the shaft operated by arm 49 may be removed entirely from the machine or either alone may be assembled with the machine.

Sometimes it is desirable to cause the error key to release all keys which may be depressed, including the repeat key. To accomplish such function member 262 (see Fig. 19) is provided with an extension or horn 295 which will move pin 280 forward if the repeat key 270 is depressed thus releasing notch 276 from the extension 277. The described extension 295 has the additional function of locking the repeat key 270 in normal position when the error key is held down. Hence the error and repeat keys are so interlocked that only one of them may be effective.

Hereinabove spring 240 has been described as effecting the return of the handle 9 when released at the end of the forward stroke. As is well known such form of a spring is relatively inefficient because it progressively loses its strength as the handle returns to normal position. If desired spring 240 may be replaced by the returning mechanism illustrated in Fig. 22. A link 300 extends between a pin 301 on cam member 19 and pin 302 rigid with arm 303. Said arm 303 is rigid with a stub shaft 305 to which is attached the inner end of a volute spring 304, the other end of said spring is attached in a suitable manner such as a stud to the main framework of the machine. Normally arm 303 and link 300 form an almost straightened toggle so that the reduced tension of spring 304 can exert considerable traction on cam member 19. When the main shaft 17 is rotated forward by the handle 9 a substantially constant resistance is exerted against such movement by spring 304 and by the same token said spring exerts a substantially constant returning force on the handle.

We claim:

1. In a machine of the character described, the combination of a totalizer comprising a plurality of denominational totalizer wheels, actuating means for actuating said totalizer wheels, a series of digital keys arranged in denominational rows in a keyboard, and a key controlled stop for each of said keys for controlling the extent of movement of the said actuating means, the stops controlled by the forward keys of said keyboard extending to the rear of stops cooperating with the higher order digital keys.

2. In a machine of the character described, the combination of a totalizer comprising a plurality of totalizer wheels, actuating means for actuating said totalizer wheels, digital keys arranged in denominational rows in a keyboard, stops operated by said keys to determine the extent of movement of the said corresponding actuating means, said keys in each denominational row being arranged in digital order, said stops operated by a denominational row of said keys being arranged in a series of non-digital order.

3. In a machine of the character described, the combination of a plurality of totalizer wheels, actuating means for actuating said totalizer wheels, a plurality of key operated stops for controlling the movement of said actuating means, certain of said key stops comprising substantially straight members with a finger key on the upper end and a stop on the lower end, and other of said key stops comprising L-shaped members having a vertical arm and a horizontal arm and with a finger key on the vertical arm and a stop member on the end of the horizontal arm, the stops controlled by the L-shaped members extending to the rear of stops cooperating with higher order digital keys.

4. In a machine of the character described, the combination of a plurality of totalizer wheels, actuating means for actuating said totalizer wheels, a plurality of key operated stops for controlling the movement of said actuating means, certain of said key stops comprising substantially straight members with a finger key on the upper end and a stop on the lower end, and other of said key stops comprising L-shaped members having a vertical arm and a horizontal arm and with a finger key on the vertical arm and a stop member on the end of the horizontal arm, the stops on said horizontal arms extending rearward of stops on certain of the straight members, said keys being arranged in denominational rows with the keys in each denominational row being in digital order, said stops operated by a denominational row of said keys being in a series of non-digital order.

5. A machine of the character described comprising in combination a plurality of totalizer wheels, actuating means for said totalizing wheels, a keyboard having keys therein arranged in denominational rows, key operated stop members for determining the extent of movement of said actuating means, certain of said key operated stop members comprising substantially straight bars arranged vertically in the keyboard and provided with finger keys on the upper ends and stops on the lower ends, and other of said key operated stop members comprising substantially L-shaped bars with a finger key on the upper end of each vertical arm and a stop on the forward end of each horizontal arm of the L-shaped members, said L-shaped key operated stop members comprising the front keys of each denominational row with the horizontal arm of L-shaped key operated stop members extending toward the rear of the machine, the stops controlled by the L-shaped keys extending to the rear of stops of a higher digital order key.

6. In a machine of the class described, the combination of a totalizer comprising a plurality of denominational register wheels, actuating racks with which said register wheels are adapted to cooperate, operating means comprising a main shaft to operate said machine, engaging means for causing said totalizer to be brought into engagement with said actuating racks, a wipe pawl operated by said operating means to render said engaging means operative during the normal adding operation, means comprising a locking cam carried by said main shaft to lock said engaging means in operative position, and key set means adapted to render said wipe pawl operative to cause said totalizer to engage said racks for totalizing operations.

7. In a machine of the class described, the combination of a totalizer comprising a plurality of denominational register wheels, actuating racks with which said register wheels are adapted to cooperate, operating means comprising a main shaft to operate said machine, and having a forward stroke and a backward stroke, engaging means for causing said totalizer to be brought into engagement with said actuating racks, a wipe pawl operated by said operating means to render said engaging means operative during the backward stroke of the operating means in the normal adding operation, means comprising a locking cam carried by said main shaft to lock said engaging means in operative position, and key set means adapted to render said wipe pawl operative to cause said totalizer to engage said racks for totalizing operations on the forward stroke of the operating means.

RALPH C. COXHEAD.
CHAS. W. NORTON.